United States Patent
Kee

(10) Patent No.: US 11,487,685 B2
(45) Date of Patent: Nov. 1, 2022

(54) INTER-DIE INTERRUPT COMMUNICATION IN A SEAMLESSLY INTEGRATED MICROCONTROLLER CHIP

(71) Applicant: AyDeeKay LLC, Aliso Viejo, CA (US)

(72) Inventor: Scott David Kee, Aliso Viejo, CA (US)

(73) Assignee: AyDeeKay LLC, Aliso Viejo, CA (US)

( * ) Notice: Subject to any disclaimer, the term of this patent is extended or adjusted under 35 U.S.C. 154(b) by 0 days.

(21) Appl. No.: 17/315,268

(22) Filed: May 8, 2021

(65) Prior Publication Data
US 2021/0326283 A1 Oct. 21, 2021

Related U.S. Application Data

(63) Continuation of application No. 17/225,057, filed on Apr. 7, 2021.
(Continued)

(51) Int. Cl.
*G06F 13/36* (2006.01)
*G06F 13/26* (2006.01)
(Continued)

(52) U.S. Cl.
CPC ............ *G06F 13/26* (2013.01); *G06F 3/0659* (2013.01); *G06F 3/0679* (2013.01); *G06F 12/0638* (2013.01); *G06F 12/0866* (2013.01); *G06F 13/14* (2013.01); *G06F 13/1668* (2013.01); *G06F 13/28* (2013.01); *G06F 13/364* (2013.01); *G06F 13/4027* (2013.01); *G06F 13/4068* (2013.01); *G06F 13/4282* (2013.01); *G06F 21/76* (2013.01); *G06F 2213/0062* (2013.01); *G06F 2213/40* (2013.01); *G06F 2221/2103* (2013.01)

(58) Field of Classification Search
None
See application file for complete search history.

(56) References Cited

U.S. PATENT DOCUMENTS 3,588,831 A * 6/1971 Figueroa ................. G06F 13/24 710/5
6,681,279 B1 1/2004 Peng
(Continued)

FOREIGN PATENT DOCUMENTS

JP 2018085129 A 5/2018

OTHER PUBLICATIONS

International Search Report and Written Opinion, PCT Patent Appl. Serial No. PCT/US2022/022068, dated Apr. 21, 2022.

*Primary Examiner* — Henry Tsai
*Assistant Examiner* — Dean Phan
(74) *Attorney, Agent, or Firm* — Steven Stupp

(57) ABSTRACT

Techniques in electronic systems, such as in systems comprising a CPU die and one or more external mixed-mode (analog) chips, may provide improvements advantages in one or more of system design, performance, cost, efficiency and programmability. In one embodiment, the CPU die comprises at least one microcontroller CPU and circuitry enabling the at least one CPU to have a full and transparent connectivity to an analog chip as if they are designed as a single chip microcontroller, while the interface design between the two is extremely efficient and with limited in number of wires, yet may provide improved performance without impact to functionality or the software model.

20 Claims, 12 Drawing Sheets

Related U.S. Application Data

(60) Provisional application No. 63/010,341, filed on Apr. 15, 2020.

(51) Int. Cl.

| | | |
|---|---|---|
| *G06F 13/40* | (2006.01) | |
| *G06F 3/06* | (2006.01) | |
| *G06F 12/06* | (2006.01) | |
| *G06F 12/0866* | (2016.01) | |
| *G06F 13/16* | (2006.01) | |
| *G06F 13/28* | (2006.01) | |
| *G06F 13/364* | (2006.01) | |
| *G06F 13/42* | (2006.01) | |
| *G06F 13/14* | (2006.01) | |
| *G06F 21/76* | (2013.01) | |

(56) References Cited

U.S. PATENT DOCUMENTS

| | | |
|---|---|---|
| 7,143,246 B2 | 11/2006 | Johns |
| 7,251,701 B2 | 7/2007 | Chikusa et al. |
| 7,353,362 B2 | 4/2008 | Georgiou et al. |
| 10,061,729 B2 | 8/2018 | Mayer et al. |
| 10,445,278 B2 | 10/2019 | Schulz et al. |
| 10,496,594 B1 | 12/2019 | Miller et al. |
| 10,552,253 B2 | 2/2020 | Iyer et al. |
| 10,552,357 B2 | 2/2020 | Wu et al. |
| 2006/0239452 A1 | 10/2006 | Jung et al. |
| 2008/0172510 A1* | 7/2008 | Chen ................ G06F 13/36 710/242 |
| 2010/0195840 A1 | 8/2010 | Ciccone et al. |
| 2012/0102250 A1 | 4/2012 | Yun et al. |
| 2015/0160993 A1 | 11/2015 | Park et al. |
| 2016/0239452 A1* | 8/2016 | Su ................ G06F 13/3625 |
| 2016/0285624 A1 | 9/2016 | Wagh et al. |
| 2020/0097320 A1* | 3/2020 | Liang ............. G06F 9/30043 |

\* cited by examiner

INTER-DIE INTERRUPT COMMUNICATION IN A SEAMLESSLY INTEGRATED MICROCONTROLLER CHIP

CROSS REFERENCE TO RELATED APPLICATIONS

This application is a continuation of U.S. patent application Ser. No. 17/225,057, "Seamlessly Integrated Microcontroller Chip," filed on Apr. 7, 2021, by Scott David Kee, which claims priority under 35 U.S.C. 119(e) to: U.S. Provisional Application Ser. No. 63/010,341, "Seamlessly Integrated Microcontroller Chip," filed on Apr. 15, 2020, by Scott David Kee, the contents of both of which are herein incorporated by reference.

FIELD

Communication of inter-die interrupts in a seamlessly integrated microcontroller chip, which includes a microcontroller CPU, memory and analog devices residing on separate process nodes, is described. This integrated system provides reduced cost or complexity, higher efficiency, shorter time to market while maintaining seamless integration without noticeable loss of performance.

BACKGROUND

Unless expressly identified as being publicly or well known, mention herein of techniques and concepts, including for context, definitions, or comparison purposes, should not be construed as an admission that such techniques and concepts are previously publicly known or otherwise part of the prior art. References cited herein (if any), including patents, patent applications, and publications, are hereby incorporated by reference in their entirety, whether specifically incorporated or not, for all purposes.

In the world of microcontrollers and microcomputers, we face the challenge of effectively developing and integrating I/O peripherals and systems that adapt to various environments and functions. A solution that works for one industry, does not work for all and needs to be modified. This challenge in turn creates large scaling issues where ASIC devices need to be modified for almost any control function.

Existing solutions integrate a CPU, memory and peripherals access onto a single die. The interfaces between the I/O peripherals and the CPU, Clock and Memory access are tightly coupled and managed to achieve desired performance.

Changes in the I/O or any other element within the die may involve new hardware and software designs in order to maintain performance and external interfaces into the die. Changes in the CPU will result with the same.

Additionally, some components such as CPU logic and memory can be better implemented in one manufacturing process while others such as high voltage and precision analog can be better implemented in a different manufacturing process. Implementation of all components on the same die can increase cost and reduce performance relative to what could be achieved were each component to be implemented in the manufacturing process which better suits its needs.

Decoupling between the CPU and the I/O is challenging because of the tight relationship and associated interactions between the bus, interrupts, Direct Memory Access (DMA), and clock.

To overcome this issue, existing solutions provide a large number of wires (input/output) into the die to enable an external interface to manage the system. Or some solutions separate between the CPU and the peripherals as a stand-alone ASIC (sometimes Analog ASIC), which creates a complex interface problem for system designers and programmers. The separation of the CPU and the ASIC does not solve the programming challenges when one stacks (or side-by-side) the two together.

Programming complexity for die-to-die interfaces include having to use a larger number of CPU instructions to perform a logical operation on a peripheral on the remote die. Furthermore, changes to usual interfaces such as interrupt service requests and direct memory access requests can result in software having to manage such functions using polling mechanisms or providing individual general-purpose input/outputs for interconnects to these features. Certain features such as security management of bus transactions, peripheral data flow control for bus transactions, transaction error reporting and data block transfers can be required to be managed directly by the software, whereas in single-die approaches these can be handled in hardware. Other features like providing automatic PMU state propagation between CPU and power management which can be located on the remote die would also have to be managed by software, or dedicated interconnects be provided to transfer the standard signals directly.

Therefore, there is a need for an inter die hardware architecture that allow bridging the entire bus plus interrupt plus DMA and other desired structures while replacing a much larger number of wires with the logical structure that leads to minimizing the inter-die communication interface and at the same time providing behavior to components each die logically equivalent to what would have occurred had they been implemented on the same die with the usual fully parallel set of signals. An interface that allows peripherals located on a die different from the CPU to be implemented with full-featured standard bus interfaces, allowing peripherals to be designed agnostic to whether they ultimately are located on the same die as the CPU or on a different die. Further, adding or removing peripherals on/from the ASIC portion or moving components between CPU and ASIC dies, do not impact the interface, thus enabling rapid changes in designs associated with diverse systems and their specific needs. And if the interface itself is a generic format, any die containing a CPU can be coupled to any die containing peripherals even if these two dice had not both been designed for this specific arrangement. A CPU die can be used across multiple designs (including ones originally not envisaged when the CPU die design was done). Or a non-CPU die can be paired with multiple different CPU dice to efficiently implement variations in processing capability using a common design for the common peripherals.

SUMMARY

A system is described. This system may include: a first die with a central processing unit (CPU) and a first bridge; a second die with a second bridge, where the second die excludes a second CPU or that has a third CPU unrelated to the first bridge and the second bridge. Moreover, the system includes die-to-die interconnects electrically coupled to the first bridge and the second bridge, where the die-to-die interconnects include fewer signal lines than a first bus in the first die and a second bus in the second die. Furthermore, the first bridge and the second bridge mask existence of the die-to-die interconnects, so that a function of the second die appears as though it is implemented on the first die to a master on the first die (such as the CPU).

Note the first die may include multiple devices, one or more of which may act as a bus master that engages in bus transactions to bus slaves on the second die via the die-to-die interconnects.

Moreover, the second bridge may pause a transaction by the bus master on the first die to allow servicing of a transaction by a second bus master on the first die or the second die to occur via the die-to-die interconnects prior to finalizing the paused transaction by the first bus master.

Furthermore, the second die may include multiple devices, one or more of which may act as a bus slave with respect to the first bridge and the second bridge.

Additionally, the first die may provide a single wider bandwidth interconnects when only a single instance of the second die is implemented, while allowing two lower bandwidth connections for implementations where there are two instances of the second die.

In some embodiments, a software model implemented on the first die is the same as if it was implemented on a single-die system.

Note that the first bus and the second bus may have a common format. For example, the format may include: an ARM Advanced Microcontroller Bus Architecture (AHB), AHBLite or AHB5. Alternatively or additionally, the format may include a Wishbone architecture.

Moreover, the system may include: a second bus master on the second die electrically coupled to a third bus on the second die and a third bridge electrically coupled to the third bus as a bus slave; a second bus slave on the first die electrically coupled to a fourth bus on the first die, and a fourth bridge electrically coupled to the fourth bus as a bus master; and second die-to-die interconnects that convey second signals between the third bridge and the fourth bridge, where a number of the second die-to-die interconnects is less than a number of signal lines between the second bus master and the third bridge. The first bridge, the second bridge, and the die-to-die interconnects may enable the bus master to engage in bus transactions with the bus slave in the same manner as if the bus transactions occurred in a single-die system.

Furthermore, CPU instructions for accessing the bus slave on the second die may be the same as if the bus slave was implemented on the first die.

Additionally, the first bridge and the second bridge may sequentially use the die-to-die interconnects for command transport followed by selective data transport. In some embodiments, the command transport is communicated in a single clock cycle. Alternatively, the command transport may be serialized over a number of clock cycles while being transparent to the first die or while being transparent to a software model on the first die. Moreover, a serialization length for serialization may be variable based at least in part on command contents.

Note that the command transport may maintain the same clock cycle as if the system was implemented on a single die without the first bridge or the second bridge.

Furthermore, a data phase may have a different data direction for one or more of the die-to-die interconnects. For example, a data direction may be decoded from command contents. Additionally, the data transport may be communicated in a single clock cycle or may be serialized over a number of clock cycles. A data transport serialization length may be decoded from previous command contents.

In some embodiments, the die-to-die interconnects may provide a phase indication from the first die to the second die as to whether a following phase is a command phase or a data phase. For example, the phase indication may be used to provide more than one data transfer for a single command transfer.

Moreover, a bus address on the second die may be updated for each data phase according to an instruction provided during a previous command phase.

Furthermore, the first bridge may perform multiple data phases in response to a burst indication on the first bus.

In some embodiments, the first bridge may perform multiple data phases in response to detection of sequential access addresses on the first bus. Alternatively or additionally, the first bridge may perform multiple data phases in response to a direct memory access (DMA) controller indication.

Note that the die-to-die interconnects may implement transactions unrelated to the first bus or the second bus.

Moreover, unrelated commands may be indicated by coding during a command phase.

Another embodiment provides the first die.

Another embodiment provides the second die.

Another embodiment provides an electronic device that includes the first die, the second die and the die-to-die interconnects.

Another embodiment provides a method for communicating between the first die with the first bridge and the second die with the second bridge. This method includes at least some of the operations performed by the first die and the second die.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

Note that like reference numerals refer to corresponding parts throughout the drawings. Moreover, multiple instances of the same part are designated by a common prefix separated from an instance number by a dash.

DETAILED DESCRIPTION

Figure 1:
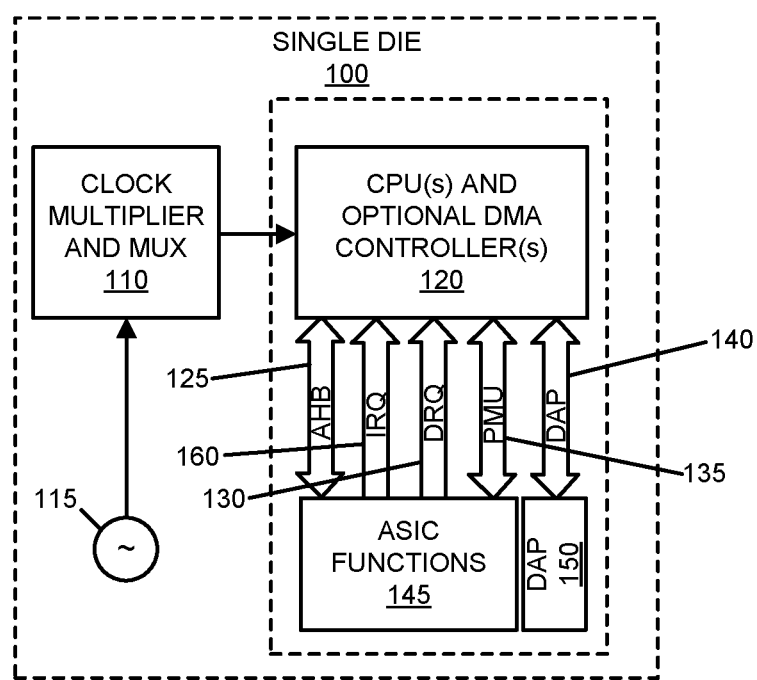
FIG. 1 is a block diagram illustrating a single die-system.

The disclosed communication techniques are implementable in numerous ways, e.g., as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. As discussed in more detail below, the present disclosure provides an exposition of one or more embodiments of the disclosed communication techniques that may enable improvements in factors such as one or more of security, cost, profitability, performance, efficiency, and/or utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail below, the disclosed communication techniques encompass numerous possible modifications and variations within the scope of the issued claims.

The disclosed communication techniques provide a die-to-die interface/bridge that allows a multi-die microcontroller implementation in a manner that is transparent to the end user. By bridging several standard microcontroller interfaces between the two dice, peripherals can be implemented to be largely agnostic to which of the two dice they are implemented in. In fact, the user will experience a single microcontroller unit. The bridging is non-trivial and may provide solutions for missing elements within existing art.

Existing bus extensions do not support features and behaviors that are typical in a single die microcontroller. One would naively think that we could in principle connect all wires when we split a single die into multiple dice. Typically, this works only in theory and often requires physical line connection for every internal interface.

The "connect all the wires" approach makes no sense since it will be easier to simply have it all on the same die. What we are looking for is to minimize the number of interconnect counts while enabling reasonably complex interactions with a plurality of remote die. The disclosed communication techniques may be superior to the traditional external bus extensions (e.g., I2C, SPI, parallel memory bus, etc.). Notably, the communication techniques may provide advantages, such as:

The same software programming model as for single die integration. Bus peripherals on remote die respond directly to CPU bus memory mapped accesses.

Lower latency for accesses to peripherals on remote die despite the lower interconnect count. In some embodiments, this can be effectively zero additional latency with a realistic configuration Reducing the number of opcodes executed by the software for each remote peripheral access operation, furthermore the number of opcodes is the same as for a single die, but less than what would have been if something like other external bus extensions, were to have been used.

Providing the usual bus features, using the usual standardized interfaces for masters on CPU die and slaves on remote die, including: transparent slave stalling (flow control) when remote slave is not ready for data delivery (either read or write); transaction error reporting; support for security features e.g., access privilege/security; automatic arbitration of remote slaves between multiple bus masters (e.g., CPU and DMA); and/or burst mode transfers.

Providing individualized interrupt request capability from a potentially large number of peripherals in the usual manner e.g., in a manner that is transparent to the end points.

Providing individualized DMA request capability from peripherals in the usual manner. For example, a DMA request de-assertion during DMA data transfer synchronized to bus transfer data stage.

Enabling inter die synchronization for power management features in a transparent fashion.

Enabling transparent security feature configuration between CPU die and ASIC die other than bus access privileges, such as debug port access.

Remote die design and manufacturing independent of the CPU die—also enabling last minute additions or redesigning of interfaces/peripherals on the remote die with no impact to the CPU die or to the software model.

Enabling multi-die products wherein components impossible or impractical to integrate on a CPU die (e.g., due to process technology being incompatible) can be paired with a remote die implementing these components, while being transparent to component interface specifications and programmer model on both dies.

Enabling boot time discovery/mapping of the peripherals die.

Enabling runtime adjustable interconnect count to pair a single CPU die with multiple different ASIC dies with different interconnect counts, without changing software model or peripheral component designs on remote die.

A detailed description of one or more embodiments of the disclosed communication techniques are provided below along with accompanying figures illustrating selected details of the disclosed communication techniques. The disclosed communication techniques are described in connection with the embodiments. The embodiments herein are understood to be merely exemplary. The disclosed communication techniques are expressly not limited to or by any or all of the embodiments herein, and the disclosed communication techniques encompasses numerous combinations, alternatives, modifications, and equivalents. To avoid monotony in the exposition, a variety of word labels (such as: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the disclosed communication techniques. Wherever multiple embodiments serve to describe variations in process, system, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the disclosed communication techniques. The details are provided for the purpose of example and the invention may be practiced according to the claims without some or all of the details. For the purpose of clarity, technical material that is known in the technical fields related to the disclosed communication techniques have not been described in detail so that the disclosed communication techniques are not unnecessarily obscured.

Microcontrollers are used in a wide array of systems and devices. Devices often utilize multiple microcontrollers that work together within the device to handle their respective tasks.

Microcontrollers are an embedded and real time device used to control a singular function or limited number of functions in a device or a larger system. It does this by interpreting data it receives from its peripherals using its central processor (CPU) and memory. Peripherals can be integrated (e.g., a temperature sensor or radio communication interface integrated into the microcontroller), analog I/O interfaces (e.g., an analog-to-digital converter or an LCD driver) or digital interfaces (e.g., general purpose individual input/output signal drivers or SPI communication interface). The temporary information that the microcontroller receives is stored in its data memory, where the processor accesses it and uses instructions stored in its program memory to decipher and apply the incoming data. It then uses its I/O peripherals to communicate and/or enact the appropriate action.

For example, a car might have many microcontrollers that control various individual systems within, such as the anti-lock braking system, traction control, fuel injection or suspension control. Such microcontrollers can be responsible for interacting with the hardware implementing these systems, such as sensing and controlling analog or digital components. Furthermore, these microcontrollers often communicate with each other using communication interfaces to coordinate their actions. Some might communicate with a more complex central computer within the car, and others might only communicate with other microcontrollers.

FIG. 1 illustrates at a high level a single die microcontroller 100 architecture including a clock multiplier and multiplexor (mux) 110 with its source 115, a plurality of CPUs and optional DMA controllers 120, basic ASIC functions 145 that interfaces with a AHB bus 125, a plurality of Interrupt Request signals (IRQs) 160 for managing interrupts, a plurality of DMA Request signals (DRQs) 130 for automated DMA servicing, Power Management Unit (PMU) interface 135, and Debug Access Port (DAP) 150 which interacts with one or more of the CPUs or other internal components through debug access port interface 140. (Note that advanced high-performance bus or AHB is a bus architecture defined in the ARM Advanced Microcontroller Bus Architecture (AMBA), which is an open standard on-chip interconnect specification for the connection and management of functional blocks in system-on-a-chip (SoC) designs. Other bus formats in AMBA include APB and AXI.) FIG. 1 depicts some of the functionality and internal interfaces which we will discuss in more detail as we move from a single die design to a multi-die design of the disclosed communication techniques. Throughout this disclosure we may use the AHB 125 as in one embodiment. The disclosed communication techniques are not limited to the specific characteristics of the AHB bus design and uses this known art as implementation example. Additionally, AHB interface 125 can include further bus tiers inside ASIC functions 145 such as one or more APB buses, so that bus slaves inside ASIC functions 145 may be attached through AHB interface 125 but not directly to it.

Microcontrollers are typically provisioned to trade computation power for low cost. Due to the real-time aspect of the sense/react sequence, computation performance in microcontrollers is typically optimized for bounding the combined latency of the system by bounding the sense/react sequence. The time to execute this entire sequence can often be measured in fractions of a millisecond. This is unlike a computation processor which can accept much higher and more variable latency but while potentially handling a larger number of unrelated tasks and is optimized for averaged performance over much larger timescales. As a consequence, the architecture connecting the CPU to its peripheral resources is more tightly coupled. Typically, microcontroller CPUs are running at the same frequency (or some small multiple) of the peripherals and main memory and expect CPU to interact with these components at word (native word bit size of that specific system) level either on the CPUs own main bus (or bridged through to some different format bus). Each word access for which the target imposes access delay results in processor execution to stall during that delay. Computation processors are optimized instead to typically be interacting with local cache memories and have various mitigation strategies to continue doing useful work when the cache doesn't contain the desired data. In these processors, the processor is connected to non-cache components primarily through a cache. Further in this case, a slow peripheral access will typically be transformed into a block transaction or a cache page filled with an initial CPU execution stall while the missing data transfers. Typically, the CPU will have some stalling measured across its various threads as the thread stalled while waiting for data is only part of the overall workload and that thread can often yield its execution to other threads while the data block is transferred. Thereafter, the computation processor can work efficiently on the entire block of data without interruptions due to access latency. As microcontrollers are accessing peripheral memory more frequently and typically on a word basis, a slow peripheral would stall the CPU again on each word access. For performance reasons microcontrollers typically attach peripherals directly or directly bridged to the own bus structure of the CPU.

The notional purpose of a CPU bus is to handle memory (or memory-mapped) data transfers. But other functions are usually required and therefore performed over this same bus. These tasks are composed of: data stall from a bus slave; response from slave indicating result of transaction (e.g., ok or illegal access); and/or bus master indication of transfer purpose/privileges such as: access purpose is code or data; access is from kernel or user access privilege; whether transaction is for secure data; and/or if write access can be buffered (not necessary to wait for slave response before moving on to next transaction if slave is slow).

Interrupts are typically used by microcontrollers to allow a peripheral to indicate occurrence of a time critical event. A peripheral can drive an interrupt request (IRQ) signal to indicate a condition possibly requiring CPU action. Microcontroller CPUs are typically paired with an interrupt controller, e.g., a nested vector interrupt controller (NVIC), which registers events on the various IRQ lines as they occur into an interrupt pending register. (Note that nested vector interrupt control (NVIC) is a method of prioritizing interrupts, improving the performance of the CPU and reducing interrupt latency. NVIC also provides implementation schemes for handling interrupts that occur when other interrupts are being executed or when the CPU is in the process of restoring its previous state and resuming its suspended process.) While the pending register for that IRQ line has been set, subsequent changes on that IRQ line are ignored. Furthermore, policies can be put in place to provide hardware responses to IRQ activity, such as to automatically begin execution of a block of code associated with that IRQ line (interrupt handler). If programmed to automatically execute an interrupt handler, the execution by the handler typically automatically clears the associated interrupt event register. If the CPU chooses to not enable an automatic handler, the CPU can inspect the pending register itself and clear it to re-arm IRQ capturing. Microcontroller peripherals typically implement their IRQ indication as an individualized signal to the interrupt controller, with interrupt controllers having a number of inputs to receive such signals. In some cases, a microcontroller peripheral may expect to provide multiple IRQ signals, such as to indicate different events on different IRQ signals.

IRQ signals are typically noted as level based or edge based. Level based interrupts are typically used for situations where the intended interpretation is that the peripheral has one or more unhandled events. This is particularly appropriate when a peripheral can have multiple different kinds of events to signal and multiple such events can occur simultaneously. A peripheral will typically mark unhandled events in a register (interrupt flags) accessible to the microcontroller over the bus. As long as any events are marked in this register, the peripheral will assert the IRQ line. The CPU can then clear one or more events out of this register by bus access once it has handled that event (such as performing a responsive action or changing memory state to mark for some later action). If an interrupt handler exits and there are unhandled events in the flags register, the IRQ line will still be asserted and the pending register will be set again for further processing.

Edge based interrupts are communicated from peripheral to interrupt controller as an event, typically as a data change on the IRQ signal, such as a data 0 followed by a data 1 (rise edge). In this case, the interrupt controller can be configured to only set the pending register in response to this sequence and the peripheral can ensure that this sequence is only delivered once per peripheral event. Edge based interrupts are more commonly used when the message from the peripheral should be interpreted as a single event (for instance if the number of events needs to be accurately counted or if behavior would be compromised by accidental re-entry of an interrupt handler due to de-activation of the IRQ line being delivered to the interrupt controller after some delay.

Microcontrollers can be implemented with a direct memory access controller to assist in automating data transfers. Microcontrollers typically implement $3^{rd}$ party DMA as opposed to $1^{st}$ party DMA, so that a peripheral with data to be moved to/from another location such as main memory can alert a DMA controller that an operation is required so that this controller can implement the required operation as a bus master with the peripheral as a bus slave. $3^{rd}$ party DMA has lower implementation cost but also lower performance. DMA transactions can be either CPU initiated or peripheral initiated. For a peripheral to alert the DMA controller that there is a desired peripheral-initiated transaction, it is typical to use DMA (DRQ) request signals driven by the peripheral to the controller. The controller can then respond to that request according to the policy that the CPU has assigned to that request. When not already engaged in a transaction for that policy, the controller interprets an active level on the DRQ line as a desire for a transfer to occur. Outside of certain exceptional cases (such as the CPU intervening to cancel the pending transfer), it is expected for the peripheral to continue requesting until responsive transfers occur. This can be to make sufficient transfers to place a data buffer into a desired level of fullness, provide indication that a data buffer can be retired, or other conditions specific to the operation of the requesting peripheral. Microcontroller peripherals typically indicate their DRQ indications as an individualized signal to the DMA controller, with DMA controllers having a number of inputs to receive such signals. In some cases, a microcontroller peripheral may expect to provide multiple DRQ signals, such as to indicate different types of required transfers on different DRQ signals.

DMA transactions can be fixed length or variable length, which the DMA controller can implement using suitable bus transactions, such as one or more AHB bus accesses or burst accesses. For instance, it is possible that a given peripheral will always transfer 32 bytes of data for each request as a fixed length. In other cases, the length of each transfer can be situationally dependent, so that the peripheral (but not the controller) knows the desired data to transfer. A typical strategy for allowing the $3^{rd}$ party master to handle this situation is to have the peripheral logic implemented hold the DRQ line at an active level while there is still more data in the transaction. The controller can then inspect the DRQ line after each word of a transfer and discontinue the transfer on the first bus cycle for which the peripheral de-asserts the DRQ at the same time as the data is delivered. For this reason, it is useful for the de-assertion of the DRQ be delivered to the DMA controller on exactly the same cycle as the bus data. Otherwise, the DMA controller may transfer an incorrect number of words. A similar consideration may be used for fixed length DMA transactions. Were a peripheral to de-assert its DMA request near the end of a fixed length DMA transaction, differential delay between the bus transaction completion by the DMA controller and arrival of the DRQ de-assertion could cause the DMA controller to falsely perceive the DRQ signal to be still asserted after a previous DMA transaction is completed, causing it to incorrectly initiate a subsequent transaction.

Figure 2A:
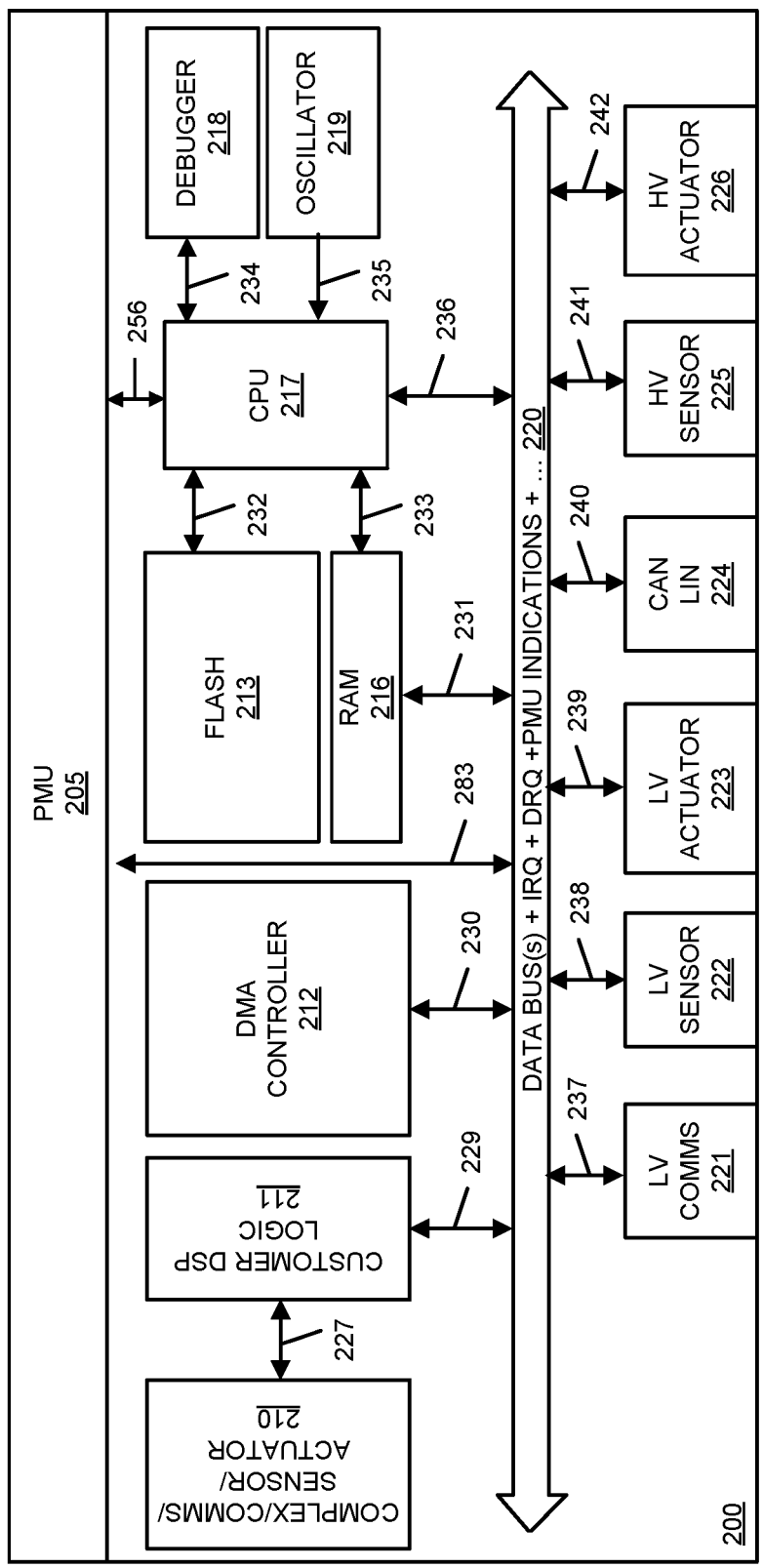
FIG. 2A is a block diagram illustrating selected details of an embodiment of a single-die system.

FIG. 2A is a component level depiction of an existing single-die architecture with additional detail to help map some of the complexity of the system. In FIG. 2A the microcontroller die 200 implements a number of interconnects to its peripheral components 220 that represents possible data and events bus lines including a plurality of DATA BUS[s] 125, IRQ signals 160, DRQ signals 130, PMU interface 135 indications and other signals representing events and state. This bus and lines are used to interface with other subsystems of the microcontroller such as: custom DSP logic 211 with interconnects 220 interface 229, DMA Controller 212 with interconnects 220 interface 230, RAM 216 with interconnects 220 interface 231, FLASH memory 213 and CPU 217 with interconnects 220 interface 236 and the other ASIC logic such as LV comms 221 with interconnects 220 interface 237, LV Sensor 222 with interconnects 220 interface 238, LV Actuator 223 with interconnects 220 interface 239, communication interface such as CAN/LIN 224 with interconnects 220 interface 240, HV sensor 225 with interconnects 220 interface 241, and HV actuator 226 with interconnects 220 interface 242. Please note that these are only examples of embodiment and could include other elements. In addition, we have added the Power Management Unit—PMU 205, debugger 218 with CPU interface 234, oscillator 219 to provide clock input via interface 235 and complex comms/sensor/actuator 210 interfacing with the custom DSP logic 211 via interface 227.

Interconnects 220 provides communication amongst the various components. These communications typically include data bus transactions (e.g., AHB), IRQ signaling, DRQ signaling, and PMU controls and indications. These interconnects are typically accessed by the various components using standardized interfaces, such as a CPU interconnect interface.

Note that it is not unusual for interconnects 220 to include some embedded logic to assist with the low-level needs of these interfaces. For instance, data transactional interconnect 125 can frequently include block address decode and data multiplexing functions to assist in the routing of data bus transactions for the correct bus slave for the address presented by a bus master. In other protocols the address decode function can be independently calculated by each bus slave and logic included in interconnects 220 utilizes address match indications from the various bus slaves to assist in data routing. To provide ability for multiple data bus masters to simultaneously engage in bus transactions, multiple lane bus fabrics (e.g., multi-layer AHB) are often implemented with routing and contention resolution logic embedded into the interconnects 220. Furthermore, in cases where there are clock domain crossings or clock rate differences, it is also common to place retiming or synchronization logic into interconnects 220.

An example of the use of interconnects 220 is an AHB data bus 125 transaction between CPU 217 and LV Sensor 222. Such a transaction can be initiated by CPU 217 issuing an AHB address phase for an AHB transaction on AHB master signals in interface 236. Block address decode logic present in interconnects 220 decodes that the address indicated in the address phase for this transaction is in an address block allocated to LV Sensor 222. Interconnects 220 then presents this AHB address phase to AHB slave signals in interface 238. A subsequent AHB data phase performs the requested transaction between CPU 217 and LV Sensor 222 through interfaces 236 and 238 and interconnects 220. The data phase can result in immediately transferred data, data transferred after a stall, or no data transferred by the bus slave indicating a transaction error. Transaction errors could be indicated in response to malformed transactions such as incorrect address or data size, for disallowed transactions such as transactions without proper authorization, or for other reasons. Other data bus formats can have other transaction results. Other bus masters can similarly utilize interconnects 220 to initiate transactions using AHB master signals in their interfaces to interconnects 220, such as DMA controller 212 using AHB master signals in interface 230. Other bus slaves can also be transacted with through interconnects 220 using AHB slave signals in their interfaces, such as custom DSP logic 211 using AHB slave signals in interface 229 or RAM 216 using AHB slave signals in interface 231.

Another example of use of interconnects 220 is HV Actuator 226 issuing an interrupt request resulting in an interrupt controller located in CPU 217. HV Actuator 226 can indicate an interrupt request on one or more interrupt request source signals in its interface 242. This signal can be provided to interrupt request receive signals in interface 236 via interconnects 220. One way to achieve this is by providing multiple numbered interrupt request receive signals in interface 236 and routing the interrupt request source signal in interface 242 to one of these numbered receive signals. Other interrupt source signals connected through interconnects 220 on other interfaces can then be routed to differently numbered interrupt request receive signals in interface 236. Other interrupt request sources can indicate interrupt requests through interconnects 220 by indications on interrupt request source signals in their interfaces, such as custom DSP logic 211 using signals in interface 229. Other interrupt controllers can receive interrupt requests through interconnects 220 through their interrupt request receive signals in their interfaces, such as DMA controller 212 using signals in interface 230.

Another example of use of interconnects 220 is a DMA transaction transferring data between LV comms 221 and RAM 216 via DMA controller 212. LV comms 221 can indicate a need to perform this transaction using one or more DMA request source signals in interface 237. Interconnects 220 can route this signal to DMA request receive signals in interface 230, indicating to DMA controller 212 that a transfer is desired. One way to achieve this is by providing multiple numbered DMA request receive signals in interface 230 and routing the DMA request source signal in interface 237 to one of these numbered receive signals. Other DMA request source signals connected through interconnects 220 on other interfaces can then be routed to differently numbered DMA requests that are received as signals over interface 230. Upon receipt of a DMA request, DMA controller 212 can then take a responsive action, such AHB transactions with LV comms 221 and RAM 216 via AHB master signals in interface 230, AHB slave signals in interfaces 237 and 231 via interconnects 220.

In some implementations, CPU 217 can have additional connections for direct communication with components. CPU 217 may access flash memory 213 directly through dedicated interface 232, and may access RAM 216 through dedicated interface 233. This can allow benefits such as lower latency, faster transfer rate, and ability to simultaneously make transfers on the dedicated interface and through interconnects 220 using interface 236.

Many microcontroller systems include power management functions, such as power sequencing and one or more sleep modes to save power when there is no activity required. The CPU of the microcontroller can execute commands to enter this sleep mode, which can result in various power saving operations such as disabling clocking, disabling power to logic blocks, disabling power to memories, disabling power to analog components, disabling power to power supplies provided to ports, etc. The CPU can take whatever actions it requires to make itself ready for this sleep mode and then (See FIG. 1.) indicate on PMU interface 135 to PMU 205, to indicate that a sleep should be executed. PMU 205 can implement logic to take steps necessary to perform this sleep. In many cases, PMU 205 and CPU 217 may perform a sequence of operations to perform a power mode change, often with acknowledgements exchanged to indicate completion of an operation in the sequence. CPU 217 typically has dedicated interface 256 (which may be part of PMU interface 135) to enable these interactions with PMU 205. It is also typical for PMU 205 to have a more generic interface 283 (which may implement at least part of PMU interface 135) to interconnects 220, such as a data bus signals for parametric configurations, interrupt requests for software notification, etc.

Prior to executing a sleep, the software can set policies such as which resources are disabled during the sleep, and what conditions would wake the processor from the sleep condition. One common technique for detecting a wake event is to have one or more of the interrupts selected to initiate this wakeup once detected. As the interrupt controller itself can typically be part of the sleeping circuitry, a part of the internal state of the interrupt controller can be transferred to logic outside of the domain to be slept into a wakeup interrupt controller (WIC). The WIC is part of the logic of the PMU 205. This WIC can then remain active during the sleep to detect appropriate interrupt activity to initiate a wakeup. The WIC can then indicate to the PMU 205 to take whatever necessary steps to re-enable the sleep-disabled resources. Once this is complete, the CPU can be provided an indication to resume activity. Part of this resumption of activity can be to transfer the relevant part of the WIC state back to the NVIC. This can provide indication to the CPU as to which of the various possible events caused the wakeup, such as by putting those interrupts into a pending state in the interrupt controller.

To facilitate software development and failure analysis, microcontroller die 200 can be implemented with a debug port implemented with debugger logic 218. This can allow a communication interface to be attached which can then control and/or examine the state of microcontroller die 200, such as by controlling code execution, examining register contents, mastering transactions on data buses, controlling PMU state, etc. CPU 217 can implement a dedicated interface 234 to enable these debug operations.

Figure 2B:
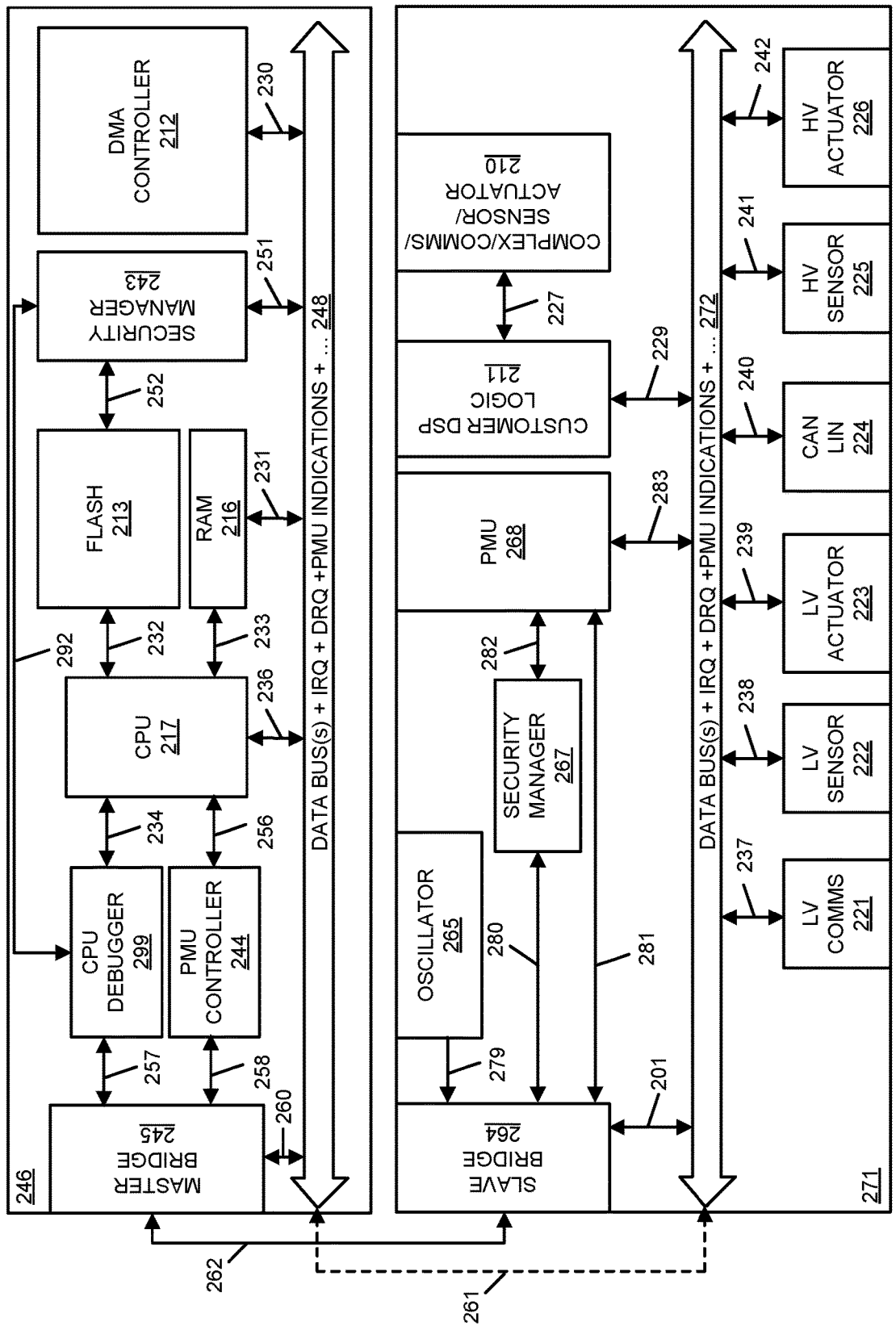
FIG. 2B is a block diagram illustrating selected details of an embodiment of a two-die system including a CPU die, an ASIC chip and selected internal architecture.

FIG. 2B depicts an embodiment splitting the single die microcontroller 200 into a two-die system while retaining full functionality and without required changes to the software model. The principle of 'retaining full functionality and without required changes to the software model' is enabled by the disclosed communication techniques. Failing to meet these criteria occurs in existing approaches. Components which would have been implemented on single die microcontroller 200, are instead implemented in a multi-die system having CPU die 246 and ASIC die 271. CPU die 246 implements CPU 217, RAM 216, flash memory 213 and DMA controller 212. ASIC die 271 implements oscillator 265, low voltage communication peripheral 221, low voltage sensor peripheral 222, low voltage actuator peripheral 223, CAN/LIN communication peripheral 224, high voltage sensor 225, high voltage actuator 226, custom DSP logic 211 its associated analog block 210. PMU 205 is broken into PMU controller 244 implemented on CPU die 246, and PMU 268 implemented on ASIC die 271. CPU die 246 includes interconnects 248, which provides connectivity between various components on that die. ASIC die 271 includes interconnects 272, which provides connectivity between various components on that die.

This choice of die location for each component in this example provides several benefits. CPU 217, flash 213, RAM 216 and DMA controller 212 can be difficult or expensive to implement in the same semiconductor process as some of the other components such as HV sensor 225, HV actuator 226, CAN/LIN 224, PMU 268 and complex comms/sensor/actuator 210. By distributing the system across the multiple dies, each die can be implemented in a semiconductor process technology appropriate for the components situated on that die. Furthermore, the components situated on CPU die 246 are relatively generic, while the components on ASIC die 271 are more specific to a particular application. By using this arrangement, it can be possible for one product to use CPU die 246 paired with ASIC die 271 while other products use the same CPU die 246 paired with a different ASIC die with components chosen for a different application.

Situating some of these components on the CPU die 246 and others on ASIC die 271 presents a challenge, as many of them had been connected to each other in the single die microcontroller 200 via interconnects 220. A seemingly simple solution would be to provide dedicated die-to-die interconnects 261 for the interconnects 220 signals for components on ASIC die 271, so that interconnects 220 is the same as for single die microcontroller 200 but is distributed across both dies as the combination of interconnects 248, interconnects 272 and inter-die signals 261. Upon examination, however, this design approach represents a challenge for a typical system as the required number of inter-die signals 261 is not realistic to implement and cannot scale. Another disadvantage of this approach is that the inter-die signals 261 are specific to the particular components located on ASIC die 271 and so pairing CPU die 246 with a different ASIC die containing different/revised components requires a CPU die 246 redesign for every new ASIC die 271.

In one embodiment of the disclosed communication techniques, the connectivity between CPU die 246 and ASIC die 271 is implemented with a significantly smaller number of die-to-die interconnects 262. These interconnects are connected through a pair of communication bridges: master bridge 245 located on the CPU die and slave bridge 264 located on the ASIC die. Master bridge 245 accesses CPU die interconnects 248 on its interface 260. Slave bridge 264 accesses ASIC die interconnects 272 on its interface 201. The combination of interface 260, master bridge 245, die-to-die interconnect 262, slave bridge 264 and interface 201 act together so that components on CPU die 246 can interact with components on ASIC die 271 in a manner similar to what would have occurred had the larger number of inter-die signals 261 been implemented. Furthermore, the CPU die component interfaces to CPU die interconnects 248 can be the same as for those component interfaces to single die interconnects 220. Similarly, the ASIC die component interfaces to ASIC die interconnects 272 can be the same as for those component interfaces to single die interconnects 220. For instance, AHB signals in CPU interface 236 and LV sensor interface 238 can be the same as they would have been in a single die 200 implementation even though they are located on different dies and are attached to different interconnects 248 and 272, respectively.

In one embodiment of the disclosed communication techniques, the die-to-die interconnect 262 is used for transaction and message exchanges. These transactions and message exchanges propagate the relevant changes between CPU interconnects 248 and ASIC die interconnects 272 in a manner similar to what would have been had the larger number of simple inter-die signals 261 been implemented. For instance, if a signal in interface 238 for LV sensor 222 were to change from a data zero to a data one, this change could be propagated to an equivalent signal in interconnects 248. To accomplish this, interconnects 272 can propagate this signal to interface 201 where slave bridge 264 can detect the data transition. Slave bridge 264 can then schedule a message or transaction to communicate this data change to master bridge 245. Master bridge 245 can then adjust its synchronized version of this signal through interface 260 so that it is available in interconnects 248 for use by components in CPU die 246. Similarly, master bridge 245 can observe changes in interconnects 248 signals for synchronization through die-to-die interconnect 262 and slave bridge 264 and provide synchronized versions of such signals on ASIC die interconnects 272 via interface 201 for use by components in ASIC die 271.

Simple signals can be synchronized by data change propagation in this manner, in other embodiments many of the typical signals and signal groups in interconnects 248 and 272 are synchronized by taking advantage of their system intent and properties. For instance, signal groups related to data bus transactions such as AHB are already indicating a transaction between components. Data bus transactions implied by these groups of signals can be detected and propagated between the bridges as specially coded transactions between the bridges to be remastered as equivalent transactions on the other die. Signal groups implementing sequential PMU state changes with completion handshakes can similarly be transformed into appropriate specially coded transactions between the bridges. Interrupt requests and DMA requests can be coded into transactions or messages in a manner which is more effective for the signaling intent of these interfaces.

We use as an example the previously discussed AHB data bus transaction between CPU 217 and LV sensor 222 as implemented in a two-die system where the two components are on CPU die 246 and ASIC die 271, respectively. As before this transaction is initiated by CPU 217 issuing an AHB address phase for an AHB transaction on AHB master signals in interface 236. Block address decode logic present in interconnects 248 decodes that the address indicated in the address phase for this transaction is in an address block allocated to an ASIC die address range. Interconnects 248 then presents this AHB address phase to AHB slave signals in interface 260. This is detected by master bridge 245 which then schedules a corresponding AHB-specific inter-die transaction through die-to-die interconnect 262. Slave bridge 264 detects and decodes this inter-die transaction and issues its own AHB address phase for an equivalent AHB transaction on AHB master signals in interface 201. Block address decode logic present in interconnects 272 decodes that the address indicated in the address phase for this transaction is an address block allocated to LV sensor 222. Interconnects 272 then presents this address phase to AHB slave signals in interface 238. This results in two incomplete AHB transactions, one between CPU 217 and master bridge 245 and another between slave bridge 264 and LV sensor 222. Depending on implementation, these transactions may be issued on the same clock cycle by combinatorially forwarding the detected transaction across the bridge, or there may be one or more clock cycles of propagation and/or arbitration latency between the address phase presented on interface 231 and the associated address phase presented on interface 201.

Both AHB transactions then must complete their AHB data phases. Any write data provided by CPU 217 on interface 236 is routed by interconnects 248 to interface 260 of master bridge 245. This data is propagated to ASIC die 271 as a data phase of the inter-die transaction through inter-die interconnects 262 to slave bridge 264, which then provides this on its interface 201 as an AHB data phase. The interconnect 272 routes this data to interface 238 for use by LV sensor 222. Any read or response data provided by LV sensor 222 on interface 238 is routed by interconnects 272 to interface 201 of slave bridge 264. This data is propagated as a data phase of the inter-die transaction through inter-die interconnects 262 to master bridge 245, which then provides this on its interface 260 as an AHB data phase.

The inter-die transaction format need not be a direct coding of the bridged AHB transactions, be at the same data rate, or be using the same native bus width. It is only necessary that the inter-die transaction format be capable of relaying the address and data phases so that the corresponding AHB transactions in interfaces 260 and 201 complete with the correct result. In some implementations it may be desirable to reduce the interconnect 262 signal count so that signals can be shared between address and data phase, or can be serialized into multiple smaller transfers. It is also not necessary for the signals used for inter-die transactions for the purpose of AHB transaction bridging to be exclusively used for this purpose. During times when those interconnect 262 signals are not busy relaying AHB transactions, other synchronization or communications needs can use those same interconnect 262 signals by differently coded inter-die transactions.

One thing to note is that the block address decode logic in interconnects 248 and 272 form a two-stage block address lookup. The block address decode logic in interconnects 248 does not require knowledge that a transaction address maps to a specific block in an ASIC die 271 component, only that it maps to an address which could be one of them. Once an AHB transaction is remastered on interface 201, the address decode logic in interconnects 272 can re-inspect the address and route to the correct component on ASIC die 271. This can allow CPU die 246 to implement a simple and generic address decoder, such as by pre-allocating a large block of addresses to ASIC die components so that the address decode logic in interconnects 248 need not change when paired with a different ASIC die.

Another example of inter-die synchronization is the previously discussed interrupt request from HV actuator 226 to an interrupt controller in CPU 217. HV Actuator 226 can indicate an interrupt request on one or more interrupt request source signals in its interface 242. This is propagated via interconnects 272 to interrupt request receive signals in interface 201 of slave bridge 264. Slave bridge 264 can then schedule a message or transaction over die-to-die interconnect 262 to propagate the detected interrupt activation to master bridge 245, which responds by indicating an interrupt request on one or more interrupt request source signals in its interface 260. This signal can be provided to interrupt request receive signals in interface 236 via interconnects 248. In one implementation, slave bridge 264 can supply multiple numbered interrupt request receive signals in interface 201 which can each be routed via interconnects 272 to interrupt source signals in interfaces of various components on ASIC die 271. Master bridge 245 can then implement the same number of interrupt source signals in interface 260 which it can provide to CPU die components via interconnects 248.

Slave bridge 264 can communicate the various numbered interrupt request activations to master bridge 245 by providing enumerated event messages through die-to-die interconnect 262. It is not necessary that all such enumerated messages correspond to interrupt activations, so that other enumerated messages can be used for other purposes. Furthermore, it is possible in certain cases to share signals in die-to-die interconnect 262 used for this messaging with signals in that interconnect used for other purposes, such as sharing with inter-die transaction response signals at times when there is an inter-die transaction occurring. In cases where lower latency is desired, it is also possible to dedicate a subset of the die-to-die interconnect 262 signals for this event message passing function.

As is discussed elsewhere in this disclosure, it can be advantageous to handle interrupt request activation and deactivation using different mechanisms. For instance, an interrupt request activation detected at interface 201 may be propagated to CPU die 246 via an event message through die-to-die interconnect 262, while deactivation may be detected by another mechanism, such as a suitable a die-to-die transaction on die-to-die interconnect 262.

Another embodiment of inter-die synchronization is the previously discussed DMA-initiated transfer of data from LV comms 221 and RAM 216 via DMA controller 212. LV comms 221 can indicate a need to perform this transaction using one or more DMA request source signals in interface 237. The interconnect 272 can route this signal to the DMA request and receive signals in interface 201. Slave bridge 264 can then schedule a message or transaction over die-to-die interconnect 262 to propagate the detected DMA request activation to master bridge 245, which responds by indicating an DMA request on one or more DMA request source signals in its interface 260. The interconnect 248 can route this signal to DMA request receive signals in interface 230, indicating to DMA controller 212 that a transfer is desired. On receipt of the DMA request, DMA controller 212 can then take a responsive action, such AHB transactions with LV comms 221 and RAM 216 via AHB master signals in interface 230. As RAM 216 is located on the same die as DMA controller 212, communication between them can proceed similarly to single die implementation 200 through interconnects 248. DMA controller 212 initiates its communication with LV comms 221 by initiating a data bus transaction on its interface 230 as in single die implementation 200, but block address decode logic in interconnects 248 selects master bridge 245 at interface 260 for the target slave. The data bus transaction through the die-to-die interconnect 262 can then proceed in a manner similar to the previously described CPU 217 and LV sensor 222 data bus transaction. DMA controller 212 does not have to be aware that LV comms 221 is on a different die.

In one implementation, slave bridge 264 can supply multiple numbered DMA request receive signals in interface 201 which can each be routed via interconnects 272 to DMA request source signals in interfaces of various components on ASIC die 271. Master bridge 245 can then implement the same number of DMA request source signals in interface 260 which it can provide to CPU die components via interconnects 248.

Slave bridge 264 can communicate the various numbered DMA request activations to master bridge 245 by providing enumerated event messages through die-to-die interconnect 262. It is not necessary that all such enumerated messages correspond to DMA activations, so that other enumerated messages can be used for other purposes such as the previously mentioned interrupt request activations. Similar mechanism(s) for reduction in die-to-die interconnects count by sharing message signaling with other functions as discussed for interrupt signaling can also be used.

It can be useful to update the DMA request indication to interface 230 of DMA controller 212 in a cycle-accurate manner, so that DMA controller 212 can respond to deactivations of the DMA request such as by stopping a transfer or not implementing a subsequent operation after a completed operation. To enable this, the response signals for the die-to-die transaction between master bridge 245 and slave bridge 264 via die-to-die interconnect 262 can indicate updates to a DMA request signal as part of the data phase transfer. For instance, if LV comms 221 provides an inactive DMA request source signal on interface 237 during a data bus transaction data phase, slave bridge 264 can detect this at interface 201 and provide a variant transaction response to include this updated DMA request information as part of the inter-die transaction data phase. This can be detected by master bridge 245 which can then update its DMA request source signal on interface 260 so as to provide this update on the same cycle as the data phase of the data bus transaction on interface 260 completes. In one embodiment, DMA controller 212 can provide additional signals on interface 230 as part of the data bus address phase to indicate which DMA request is of interest for that bus transaction. This can then be routed to interface 260 via interconnects 248 as additional address phase signals so that the inter-die transaction over die-to-die interconnect 262 can provide this information to slave bridge 264 so that it knows which of the DMA requests on its interface 201 to monitor for that data bus transaction.

Inter-die synchronization can also be used to synchronize power management functions. As PMU 268 is located on ASIC die 271 it does not have direct access to CPU PMU interface 256 located on CPU die 246. To enable PMU state changes and handshake transactions to occur between CPU 217 and PMU 268, these state changes and transactions can be transformed into inter-die transactions and messages through die-to-die interconnect 262 and bridges 245 and 264. This can be achieved by including PMU controller logic 244 into ASIC die 246, which can interact with CPU 217 as if it were PMU 205 while actually forming one end of a synchronization bridge to interact with PMU 268. To implement this, PMU controller 244 communicates with master bridge 245 using interface 258 while PMU 268 communicates with slave bridge 264 using interface 281. Transactions and messages exchanged through interface 256 are then transformed into inter-die transactions or events through die-to-die interconnects 262 along this path. This can allow CPU 217 to interact with PMU 268 in similar ways as CPU 217 interacting with PMU 205 of a single die implementation and allowing CPU PMU interface 256 to be the same in both cases. These inter-die transactions and events do not require dedicated wires in die-to-die interconnect 262, as they can be shared with wires used for other purposes, such as by providing inter-die transaction codings for PMU use or by creating enumerated event messages for PMU use.

Inter-die synchronization can also assist in locating debug access (e.g., in security manager 267) to ASIC die 271. This can be beneficial to the multi-die system in several ways. As PMU 268 is located on ASIC die 271, it can be possible for the entire CPU die 246 to be unclocked and/or unpowered when in very low-power states. If debug access is located on ASIC die 271, an external debugger can interact with PMU 268 through interface 282 to allow changes to power modes so that it can initiate or maintain communication with CPU die 246 by overriding clockless or powerless modes during a debug session. An external debugger can also interact with ASIC die 271 components even while CPU die 217 is unclocked or unpowered, such as by mastering data bus transactions over interconnects 272, such as by communicating with slave bridge 264 using interface 280 to master an AHB transaction on interface 201. This can also allow debugger control over ASIC die 271 components when CPU die 246 is damaged or not present, such as for failure analysis or testing of partially assembled products during manufacturing.

Another benefit of locating debug access on ASIC die is to allow external voltage signaling for this port to be decoupled from voltages used on CPU die 246. This can simplify the design of CPU die 246 by reducing the number or range of signaling voltages and also allow for different products using CPU die 246 with different ASIC dies to have different signaling voltages.

To enable a debugger connected to debug access to interact with CPU 217, inter-die synchronization through die-to-die interconnect 262 can be used. This can be achieved by including CPU debug logic 299 on CPU die 246. CPU debug logic 299 can interact with CPU 217 using interface 234 in a similar manner as debugger logic 218 would interact with CPU 217 in single die implementation 200. This can be achieved by transforming debug operations into transactions or events through die-to-die interconnect 262 and bridges 245 and 264. CPU debug logic 299 can interact with CPU 217 using interface 234 as if it were debugger 218 in single die implementation 200 while transforming these operations into appropriate signaling across die-to-die interconnect 262 using interface 257 to master bridge 245. Slave bridge 264 on ASIC die 271 can then use interface 280 to interact with debug access logic in security manager 267 to perform the desired debugger operation. Interconnect 262 signals used for this purpose can be shared with signals used for other purposes, such as by providing inter-die transaction codings for debugger use or by creating enumerated event messages for debugger use. In some embodiments, different widths of interconnect 262 may be used with different ASIC dies and the disclosed capabilities discovery. For example, a low-end product may use a slower and lower pin-count debug, while a higher-end product wires may allow more detailed tracing and debugging.

Security for debug access logic can be improved by adding security manager 267 to ASIC die 271. This security manager can be used to verify an attached debugger has proper authorization before allowing it to be presented to other interfaces, such as interface 280 for a CPU 217 debugger operation or interface 282 for a PMU debugger operation. This can include allowing one or more debugger operations only to debuggers with required security credentials, allowing one or more debugger operations only when the product is in a certain lifecycle state, or allowing one or more debugger operations only when the product is in a required operating mode.

To allow CPU die 246 components to influence and store security policies, security manager 243 can be included on CPU die 246. Security manager 243 can be provided access to nonvolatile memory such as to flash memory 213 via interface 252 for storing security policy configurations such as product lifecycle state, debugger authorization credentials and other security configurations. Security manager 267 can manage security policies synchronized to security manager through die-to-die interconnect 262 through bridges 245 and 264 using inter-die transactions. The signals in interconnect 262 used for these inter-die transactions can be shared with signals used for other purposes.

The debug communications port, which on a single die microcontroller had been connected to debugger 218, is now located on ASIC die 271 and is connected to debug access logic.

Note that for wires in interconnect 262 to be shared for different synchronization purposes, it can be necessary to include arbitration and prioritization between the various uses of the shared wires in the logic of bridges 245 and 264. When multiple competing services need synchronization, this arbitration logic can select amongst the various services for servicing order, while making other services wait for a time allocation.

On the ASIC die 271 we implement an oscillator 265 and its interface 279 to the bridge 264 thus the clock is extended to the bridge and to the CPU die 246. Debug access connects to the bridge master 264 through interface 280 using security manager 267 to extend debug access over the interconnect 262. PMU 268 can provide power management features on the ASIC die 271 and optionally provide power supplies for CPU die 246 as well, and can be synchronized with PMU controller 244 on the CPU die through interconnect 280 using security manager 267. Peripheral interfaces 272 which can include bus interfaces such as AHB, IRQ signals, DRQ signals and peripheral PMU indications can be synchronized to their similar counterparts 248 through interconnect 262 via bridge masters 245 and 264 and interfaces 260 and 201. (Note that peripheral interfaces 272 may couple to peripherals 221, 222, 223, 224, 225 and 226, which may have the same implementation as the corresponding peripherals on single-die 200.) As the number of signals in interfaces 248, 257 and 258 can be too large to feasibly interconnect directly, bridge masters 245 and 264 coordinate to provide the logical effect 261 of having done this so that components such as CPU 217, DMA controller 212 and peripherals 221, 222, 223, 224, 225 and 226 can implement their interfaces 237, 238, 239, 240, 241 and 242 respectively in the same fashion as would have been implemented for the same components on single-die microcontroller 200.

Note that Die-to-Die interconnect 262 may perform the physical link to enable the logical links 262 for the various interconnects 220 services. The Die-to-Die interconnect 262 interface is described in detail in FIG. 4. It connects between the CPU Die bridge master 245 and the ASIC die bridge master 264. This interconnect 262 effectively enables and implements the extension of the collection of interfaces 261 between the two dice within the respective bridge masters 245 and 264.

One can easily see that this division of a single microcontroller is not trivial and when we take into consideration that we are going to significantly reduce the number of connecting wires, e.g., the internal interconnectivity of a single die microcontroller is going to be fully extended with reduce wire count, we see the need to solve this problem.

In the disclosed communication techniques, we introduce a microcontroller architecture and interfaces 260 to the bridge 245 to include the entire bus plus interrupt plus DMA structures such that it reduces the number of wires and replaces them with the logical structure communicating through a smaller set of signals. Furthermore, other inter-die behaviors such as PMU state can be synchronized across this interface, as well as debugger port control/data. These interfaces are captured with other controls such as the CPU debug 299 via interface 257 and the PMU controller 244 via interface 258. (Note that PMU controller 244, interface 258, master bridge 245, die-to-die interconnects 262, slave bridge 264, interface 280, security manager 267, interface 282 and PMU 268 perform the same function as PMU interface 256. Also note that the explicit counterpart of debug security is not shown in FIG. 2A.) This logical structure leads to minimizing the communication interconnect while maintaining the desired logical behavior as if these eliminated wires exist, and under full control of the microcontroller firmware. This enables the microcontroller systems to be implemented using multiple dice and/or packages while keeping the interconnect signal count low without requiring significant change to the peripherals or CPU logic or behavior.

Figure 3:
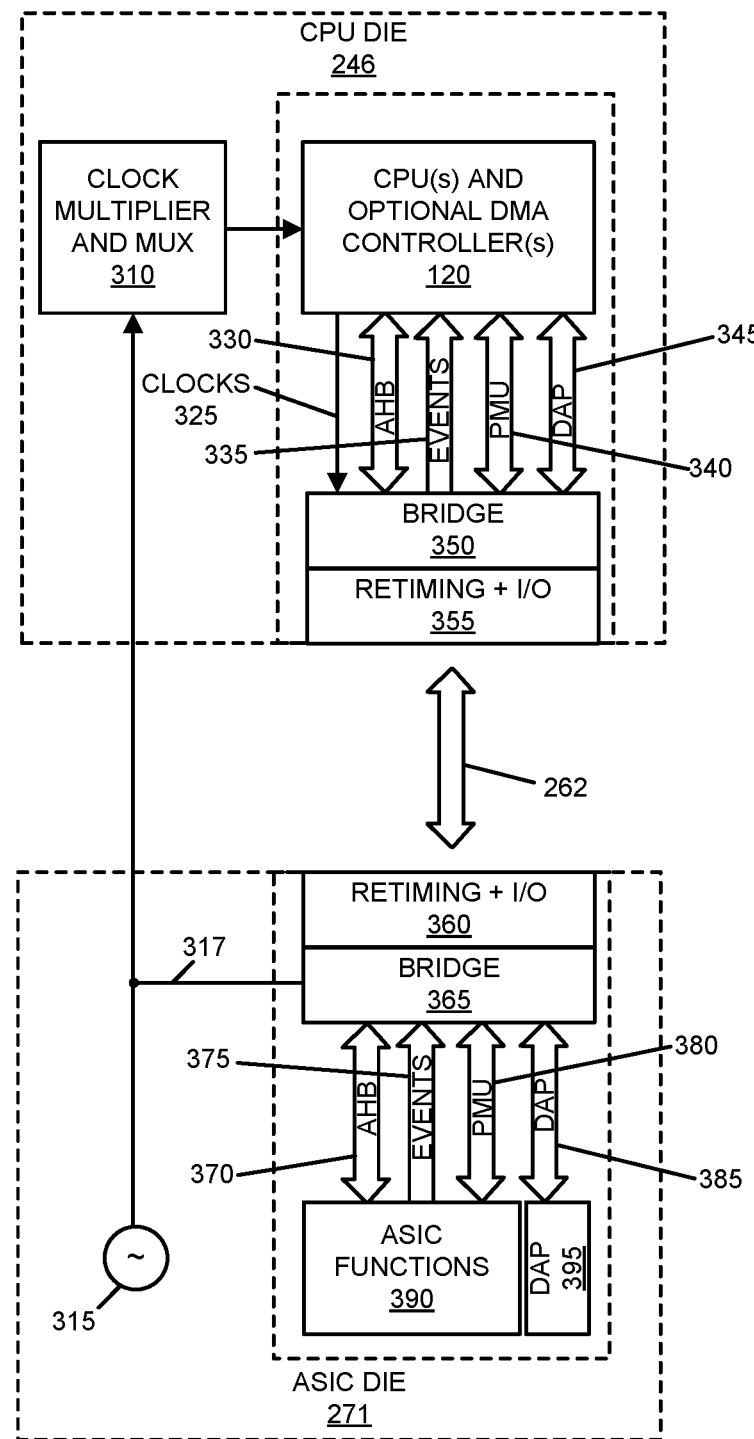
FIG. 3 is a block diagram illustrating selected details of an embodiment of a two-die system.

In FIG. 3 we use the main interfaces described in FIG. 1 to divide the single die microcontroller into two dies, CPU die 246 and ASIC die 271. In order to understand how to reduce the number of connecting wires while maintaining the full functionality of the single die microcontroller we focus on the following interfaces: bus interface AHB 330, EVENTS 335 which can include IRQs 160 and DRQs 130, PMU synchronization 340 and DAP 345. (Note that bus interface AHB 330 may communicate a subset of interface 135 for which a peripheral has been placed on ASIC die 271. Because the block addressing has been handled in a distributed manner, there may be an unlimited number of peripherals on ASIC die 271. Moreover, EVENTS 335 may communicate a subset of DRQs 130 and IRQs 160 for which a peripheral has been placed on ASIC die 271 or, for a generic CPU die, the allocation for a peripheral that may be placed on ASIC die 271. Furthermore, PMU synchronization 340 may communicate a subset of interface 135 that is not handled by PMU controller 244. Typically, clock gating and/or local power gating may be handled by PMU controller 244, while other PMU functions may involve interaction with ASIC die 271. Additionally, DAP 345 may communicate a subset of port interface 140, which may be handled through interface 280 and a debug access port.) In one embodiment the clock source 315 (or clock-source 115) may be on the ASIC die 271 to provide a clock 317 (which may be an unnumbered clock provided from clock-source 115 to clock multiplier and mux 110, and which may be further provided to bridge 264 or bridge 365), which can be extended to the CPU die clock multiplier and mux 310 (which, as discussed below, may convey an additional synchronization signal from mux 310 to bridge 350 to handle clock multiplication, but otherwise has a similar function to clock multiplier and mux 110 and, in some embodiments, may be clock multiplier and mux 110). In one embodiment bridge/serdes 350 and bridge/serdes 365 are connected through inter-die logic interconnect 262 using retiming and I/O interfaces 355 and 360 respectively. Bridge/serdes 350 can be attached to CPU die interfaces 330, 335, 340 and 345 and be provided CPU die interface clock 325. Bridge/serdes 365 can be attached to ASIC die interfaces 370, 375, 380 and 385 and be provided with ASIC die interface clock 317. (Note that ASIC die interfaces 370, 375 and 380 communicate signaling related to ASIC functions 390, while interface 385 communicates with DAP 395. These interfaces are counterparts to interfaces 330, 335, 340 and 345.) The two bridges 350 and 365 communicate through interconnect 262 to extend and synchronize the CPU die interfaces to their corresponding ASIC die interfaces.

In general, the challenge is to develop a microcontroller with two or more dies where the user and/or programmer can program it (and sees it) as a single die microcontroller. Additionally, the disclosed communication techniques use the concept of the bridge that allows IP to be integrated into the microcontroller while placed on a second die without changes to the usual microcontroller interfaces they would have used had they been on the same die. In other words, the bridge 350 and its counterpart 365 creates the appearance to both sides (software/CPU and hardware peripheral) that they are directly connected to each other. Additionally, the hardware interface on the ASIC die 271 is intentionally the same as if it had been implemented on the same die as the CPU.

In one embodiment the AHB bus 330 has at least 115 signals composed of:
HCLK (clock)
HRESETn (bus reset)
HREADY (indication that data phase is not stalled, so command phase should register)
HADDR[31:0] (32-bit address bus)
HPROT[3:0] (bus access context information)
HTRANS[1:0] (transfer type)
HSIZE[1:0] (transfer size)
HWRITE (transfer direction)
HBURST[2:0] (burst type)
HMASTLOCK (locked sequence indication)
HNONSEC (secure vs non secure access)
HWDATA[31:0] (write data, master to slave)
HRDATA[31:0] (read data, slave to master)
HREADYOUT (slave indication it is ready to complete data phase)
HRESP (slave indication if data phase should complete with error)
(Note that each slave has an instance of HREADYOUT. Consequently, each of interfaces 237, 238, 239, etc. has its own instance. The bus logic may multiplex these signals into the HREADY broadcast signal. Moreover, each slave may provide its own version of HRESP and HRDATA. Therefore, each of interfaces 237, 238, 239, etc. may provide such outputs. The bus logic may multiplex these signals into a single set of demultiplexed signals that are provided to the bus master, e.g., on interface 236 when the CPU is the bus master.)

Further, typical controllers will have multiple peripheral IRQ channels. As an example, the ARM Cortex M4 can provide 240 peripheral IRQ channels. DMA controllers typically can have 8-32 DRQ channels. To allow interrupts to wake up from a sleep the implementation needs additional sets of signals each of the same width as the IRQ set in the PMU interface. To support sequential entering and exiting sleep mode there needs to be more signals. Security policy synchronization and debug port would usually require further signals. Directly connecting these signals between the dies with dedicated wires thus would be infeasible for implementations where even 100 wires would be impossible due to cost and/or manufacturing concerns. Note that these signals may be present on interconnects 248 and 272 on the individual dies, but may be passed via messaging through die-to-die interconnects 262.

In one embodiment, a full implementation (e.g., with typically no bus stalls, almost no latency for IRQ/DRQ and PMU support) may implement one or more functions with 42 wires. Alternatively, another embodiment (which may be slightly slower) may use 18 wires. Note that a DDR version may further reduce this to a 10-wire implementation with similar performance.

Other embodiments for systems that allow 16 interrupts and no DMA or PMU support may be implemented with 3 wires. While this approach may be slow, many microcontroller applications can accommodate latency of peripheral accesses.

Figure 4:
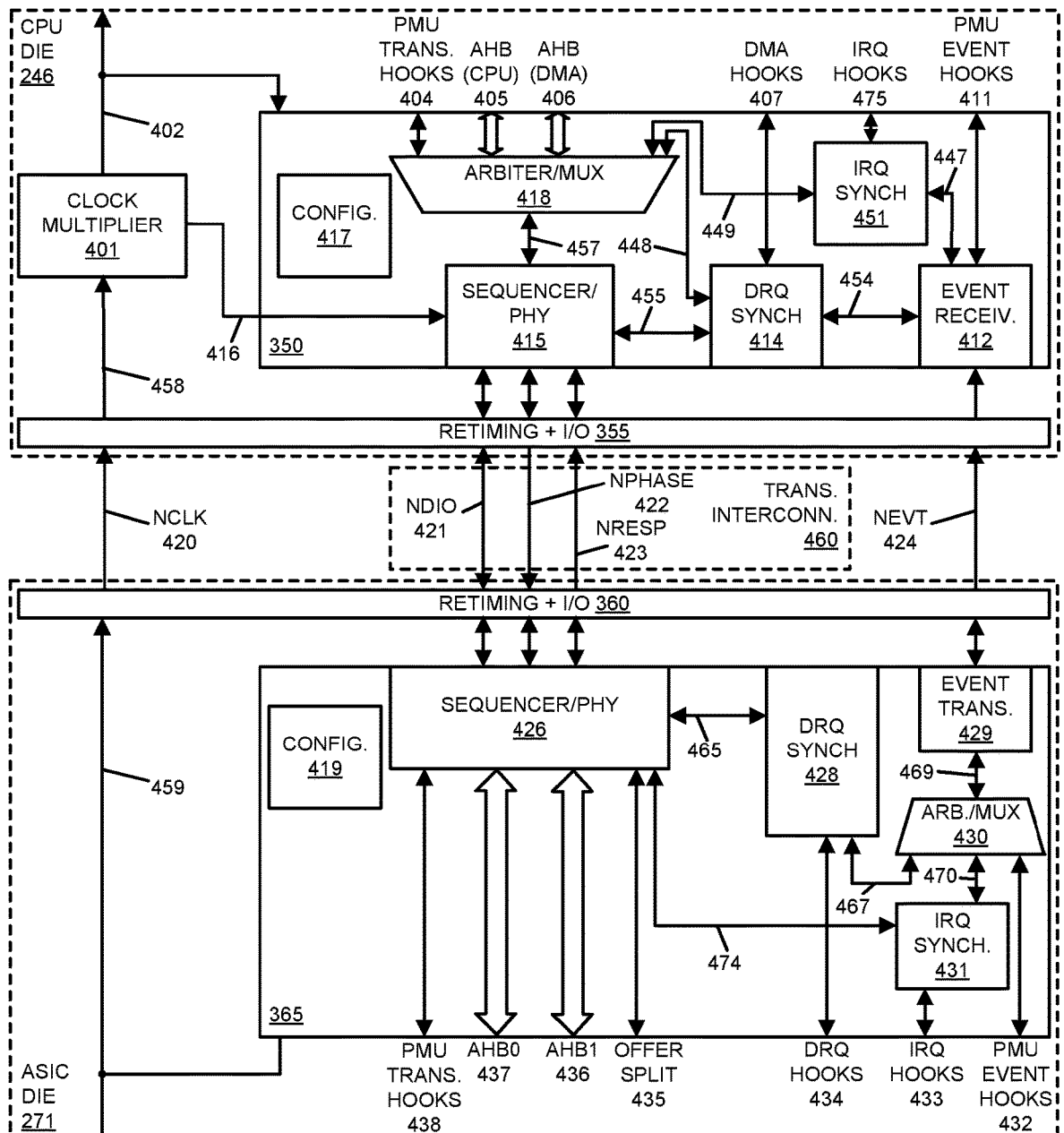
FIG. 4 is a block diagram illustrating selected details of an embodiment of an interface between a two-die system with a reduced set of wires.

FIG. 4 illustrates selected details of an embodiment of the interface between a two-die system with a minimal or reduced set of wires. A CPU die 246 contains a CPU die bridge 350 and an ASIC die 271 contains an ASIC die bridge 365. These bridges are connected with interconnect 262, which has signals NCLK 420, NDIO 421, NPHASE 422, NRESP 423, and NEVT 424. The bridges combined with the interconnect can be used to synchronize various transactions, events and services between components located on the two dies in a transparent manner. Signals NDIO 421, NRESP 423 and NEVT 424 can be multi-bit signals in some implementations, but can also be single bit implementations in others.

The interconnect 262 is divided into three signal groups. The first group includes the signal NCLK 420 which can act as a synchronizing clock for data transfers on the remaining signals. NLCK 420 may be provided by clock 459 from clock source 315 on ASIC die 271, and may correspond to clock 458 and then, following, clock multiplier 401, clock FCLK 402 on CPU die 246. The second group, transactional interconnect 460, can have NDIO 421, NRESP 423 and NPHASE 422 and is used to implement transactions initiated by the CPU die 246 while being received and/or responded to by the ASIC die 271. An example usage for this interconnect is for relaying memory-mapped bus transactions 330 on the CPU die 246 to remastered transactions 370 on the ASIC die 271, such as between AHB master 405 and an AHB slave connected through AHB interface 437. Other transactions which the CPU may need to initiate for other purposes are also transacted on transaction interconnect 460. The third group includes event relay interconnect NEVT 424 and is used primarily to propagate event messages 375 from the ASIC die 271 to events 335 on the CPU die 246. Other services can make use of both transaction interconnect 460 and NEVT signal groups, such as synchronizing CPU die 246 PMU state and events 340 with ASIC die 271 PMU state and events 380, or CPU die debug interface configuration and events 345 with ASIC die debug interface configuration and events 385.

Although this example uses AHB format bus on CPU die 246 and ASIC die 271, other format buses can be used for the bus interfaces to bridge 350 and bridge 365. Furthermore, it is also possible for all or some of the bus interfaces to be different formats from each other.

A die-to-die bridge allows for implementation of multi-die controllers in a manner which is largely transparent to the end user. Transparency in this context should be understood to be feature transparency as opposed to situational or systematic latency. By bridging several standard microcontroller interfaces between the two dice, peripherals can be implemented to be largely agnostic to which of the two dice they are implemented in. This system bridges the two dice in a master/slave relationship. The CPU die 246 is expected to contain at least one microcontroller core (CPU) and its tightly coupled memories. It can also contain one or more DMA controllers 212.

The CPU die 246 does not need to have any direct connection to the lead frame (or another type of style of packaging). The ASIC die 271 can be the gateway of the CPU die 246 to the outside world and can contain memory-mapped peripherals to implement whichever interfaces and logic are required to complete the product features not implemented on CPU die 246 in a transparent manner to the CPU. Additionally, the CPU die 246 is not required to have any power-management analog content in many instances, so that all or some of the PMU circuitry and associated logic can be implemented on the ASIC die 271. The CPU die should still control PMU content as if it were a single die system, leading to the need for a distributed PMU system.

The interfaces bridged between the dice may include the AHB bus, interrupts, DMA requests, and PMU requests and acknowledgements. Additionally, the logical bridges may include at least: AHB, IRQ, DMA, PMU and security. These logical bridges are transacted through inter-die interconnects, which include transaction interconnect 460 and event relay interconnect NEVT 424. Transactional interconnect 460 can be used for bridging AHB transactions 330 to remastered AHB transactions 370, while also providing non-AHB control commands, for example, synchronizing PMU state 340 to PMU state 380. The CPU die 246 is capable of handling AHB transactions 330 for multiple AHB masters 405 and 406 to be remastered into ASIC die AHB transactions 370 on the ASIC die 271, although many implementations might only implement servicing for a single AHB master 405. The ASIC die 271 can remaster AHB transactions 370 onto multiple AHB master interfaces 437 and 436, although many implementations may implement only one master interface.

Transactional interconnect 460 provides synchronization for various services such as: AHB bus transactions, PMU state changes, DMA and IRQ repolling and/or security. This is accomplished by implementing a physical layer transaction bridge that includes PHY 415 and PHY 426, which are connected by transaction interconnect 460 through I/O 355 and I/O 360. This allows transactional exchanges between CPU die 246 interfaces to synchronize with their AISC die 271 interfaces. For example, transactions presented to AHB slave interfaces 405 and 406 can be remastered into appropriate similar transactions on AHB master interfaces 437 and 436. Similarly, PMU operations presented to PMU transactional interface 404 can be remastered into equivalent transactions on PMU transaction interface 438. DRQ synchronization logic 414 can similarly implement transactions using interface 448 to communicate with DRQ synchronization logic 428 through interface 465. IRQ synchronization logic 451 can implement transactions using interface 449 to IRQ synchronization logic 431 using interface 474. The signaling on transaction interconnect 460 as encoded and sequenced by PHY 415 provides information which is decoded by PHY 426 to enable it to route the transaction to the relevant interface. In one embodiment this information is encoded as part of a command phase transfer. The event relay interconnect NEVT 424 can be used for passing enumerated ASIC die events 375 to CPU die events 335. Uses can include the forwarding of interrupt and DMA request assertions. Another use is for PMU synchronization to propagate PMU state changes and events or to force CPU die 246 resets from ASIC die 271.

The interrupt request synchronization is responsible for synchronizing interrupt requests detected on ASIC die IRQ interface 433 to corresponding interrupt requests on CPU die IRQ interface 475. For interrupts using event-based interrupt type, this synchronization can be accomplished using only the event relay interconnect 424 by transforming detected IRQ activations as enumerated events. For interrupts using level-based interrupt type this synchronization can require access to the transactional interconnect 460. If the interrupt controller provides configuration information on either IRQ interconnect 475 or as programming in configuration SFR bank 417, each interrupt line can provide correct behavior for each interrupt.

The DMA request synchronization is responsible for shadowing the ASIC die 271 DMA requests on ASIC die DMA interface 434 to corresponding ones in CPU die 246 DMA interface 407. Because DMA requests are level based, a pair of state machines coordinate to ensure that the knowledge of the CPU die 246 DMA request line levels are appropriate to meet the needs of the DMA controller 212. It must have access to both the transaction and event communication links to implement this function.

In some embodiments, it can be advantageous to add optional retiming logic into I/O 355 and/or I/O 360, such as to handle clock skew or clock frequency differences.

The protocol can be implemented with multiple interconnect widths; one implements a large number of interconnects and is more suitable for flip-bump assembly as the mechanism(s) for die-to-die communication, the other interfaces utilize subsets of pins to reduce the interconnect count for implementations such as to enable a smaller ball grid array or for bond-wire interconnect situations. An exemplary larger pin list includes: NCLK 420 is a single signal and a master interface clock for the transaction interconnect 460 and event relay interconnect 424. It can also be used as a timing source for the CPU die 426 internal logic or clock generators and interface signals. The transaction interconnect 460 may include: NPHASE 422, NDIO 421 and NRESP 423. NPHASE 422 is, e.g., a single bit and can provide NDIO 421 command/data phase control. NDIO 421 is, e.g., 32 bit and is the command/data content. NRESP 423 is, e.g., 3 bit and can provide the transaction response from the slave as well as flow control. The ASIC to CPU event relay interconnect includes: NEVT 424. This interface can be a suitable width to code a desired number of enumerated events in one or more transfer cycles.

These signals can be synchronized by an interface clock NCLK 420. In one embodiment clock can be provided from ASIC die 271 to the CPU die 246, in other embodiment clock can be provided by the CPU die 246 to the ASIC die 271, or both dies can be provided by another source. In one embodiment the interface clock can be synchronized to the CPU die 246 clock FCLK 402 (which is the source for the bus clock of that die, e.g., HCLK), such as by having the same frequency clock or by having FCLK 402 be a multiple of NCLK 420. Similarly, the ASIC die 271 logic can be synchronized to the NCLK 420.

It is possible to reduce the wire count of all or part of the interconnect by using double-data-rate (DDR) signaling for those interconnect signals, such as by transferring NDIO 421 data on both edges of NCLK. Other interfaces such as NRESP 423 and NEVT 424 can also use DDR to reduce interconnect count.

If the CPU die 246 FCLK 402 is a multiple of NCLK 420, a clock multiplier 401 can be used on the CPU die 246 to generate FCLK 402 from NCLK 420. In order to coordinate the timing of the inter-die interconnect, the clock multiplier 401 can provide a signal to the CPU die bridge 350 indicating the phase relationship of NCLK 420 and FCLK 402 on a cycle-by-cycle basis of FCLK 402. In one implementation, the clock multiplier 401 can provide a logic signal RE_STRB 416 synchronized to FCLK 402 indicating that the next FCLK 402 edge is also an edge of NCLK 420. The sequencer/PHY 415 logic can then use this signal to coordinate updates to/from the interconnect logic occurring on NCLK 420 edges while signaling into the non-PHY components of the CPU die 246 can provide behavior at FCLK 402 rate.

Transactions over transactional interconnect 460 are implemented as a command phase and a data phase (commands that do not have a data phase skip the data phase). The NDIO 421 communication interface is made from stateful bidirectional drivers to allow wire reduction. During the command phase the direction is CPU die 246 to ASIC die 271. Command phase content is coded to indicate to PHY 426 whether a data phase is required and, if so, what the data direction should be. The command indicates what kind of transaction is desired and relevant details for that transaction, such as AHB address phase information or information about the desired non-AHB transaction to be implemented. For transactions which implement AHB bus transactions, this includes address, read/write, number of bytes to transfer, access privileges of the transfer etc. Other transactions can use command phase coding with enumerated fields to indicate what kind of transfer and the remainder of the command data is decoded according to that enumerated command type. The data phase contains the payload of the transaction (for commands which the command phase content indicates data phase should be performed).

These transactional interconnect 460 transactions can be implemented with bidirectional NDIO 421 signals and ASIC to CPU NRESP 423 signals. NDIO 421 propagates the command and data phase content, while NRESP 423 primarily provides data phase response (such as OK, ERROR) along with data phase flow control, but during command phase can optionally be used to provide other information from ASIC to CPU. To facilitate burst transactions and synchronization, an additional signal CPU to ASIC signal NPHASE 422 can be used.

The number of interconnects allocated to the BUS transactions can be adjusted to make a cost vs latency tradeoff. The (exemplary) raw width of the command and data phase transfers over NDIO 421 is 32 bits. In one embodiment implementing a 32-bit AHB (or other pipelined) interface without any noticeable (to the CPU) latency, NDIO 421 can be 32-bits wide. Low latency is achieved because a pipelined CPU bus issues command phase transactions for the 'next' data phase at the same time as retiring the data phase for the previously issued command phase. So, a command phase and a data phase for a peripheral access occur on different bus clock cycles, so the NDIO interconnect can be used for command transport on one NCLK cycle and the related data transport on the subsequent cycle. Due to normal behavior of compiled code, it is nearly impossible for a CPU to access a non-memory address on two sequential cycles (because the CPU needs to calculate the next access address). In one embodiment, during the command phase, up to 32 bits of command phase content can be provided by CPU die 246 on NDIO interconnects 421 to instruct the ASIC die 271. If the command indicates a data phase, then both ASIC and CPU adjust data direction for the following data phase and the (up to 32-bit) data is transferred using the 32 NDIO 421 signals as a data phase.

In one embodiment, to implement an AHB bus operation, the command phase content could be allocated as: one bit for read/write data direction; two bits for data transfer size (8,16,32, or special number of bits); 20 bits of access address (1 MB). This can be treated as an address offset from some mutually understood ASIC die base address; and/or up to 9-bits additional information about the transfer.

To extend the available command or address space, information coded into a first command bus cycle can indicate need for a $2^{nd}$ bus cycle. In this embodiment the combined 64 bits of extended command content can be transmitted. For instance, one of the additional reserved bits in the above example could be used to indicate an address with more than 1 MB offset from the base address. The 20 LSBs of the address might transfer on the first command cycle as usual, and the $2^{nd}$ bus cycle used to transfer the remaining MSBs. The CPU side of the bridge can inspect the bus address offset of the CPU, and if it can be expressed in 20 bits then it can issue the more efficient single cycle command. Otherwise, it can indicate the need for a $2^{nd}$ cycle and provide the remaining information. By arrangement of the address space in the ASIC die 271 to locate the most commonly used addresses in the lower 1 MB, most accesses will then be able to use the shorter command version. Similarly, the bits available for additional transfer information is insufficient to encode some possibilities for the various AHB address phase signals. By coding these bits so that one of the codings indicates need to add an additional command phase cycle to provide additional command content, the other single-cycle codings can be used to express the most commonly used values for these AHB signals so that only rarely will the $2^{nd}$ command phase transfer be required.

Another approach to indicate extended and/or alternate commands is to utilize the uncoded values of one or more of the normal command signals to indicate an alternate command format. For instance, in the above example there are two bits used to express three possibilities for transfer size. Using the fourth (otherwise illegal) value of this two-bit coding can signal that the entire command coding should be treated in an alternate way. This can be used to provide more or different information about bus transfers, but also to engage in transactions initiated by the CPU die 246 which are not mapped from bus operations (CTRL commands). For instance: PMU state change indications could be signaled from CPU to ASIC. These CTRL transactions can have codings so that for some subset of the codings the data phase is skipped. This can allow frequent but simple CTRL transactions to use only a command bus cycle, reducing time spent on the bus. Other CTRL codings could indicate a data phase and perform a data transfer to transfer data relevant to that transaction.

The command phase can provide special security or sequencing information about the transfer. Certain bus transactions could only be authorized for code running with certain execution privileges and/or certain authorized bus masters on the CPU die (e.g., can only be implemented by CPU1, so that CPU2 and a DMA controller 212 are not authorized). For bus transactions needing these special authorizations, the CPU side of the bridge can observe these conditions as being present on CPU die 246 AHB slave interface 405 and utilize the extended command cycle to communicate this additional transaction information for propagation to ASIC die AHB master interface 437.

Once the command phase has executed (and if the command coding indicates for a data phase), the NDIO 421 signals can be used to transfer the data. If the data direction is ASIC to CPU (read) then both dies change data direction on NDIO 421 after command phase completion. The data transfer can then use one or more cycles to transfer the associated data. To implement typical 32-bit single bus transfers, a 32-bit NDIO 421 bus can complete this in one data phase cycle. To transfer more data, a variant command can be used to indicate a larger size data. Both dies will then use enough bus cycles to transfer the indicated amount of data. This can be used for CTRL transfers with large payload, for bus burst transfers, and for transfers with larger than 32-bit word size (e.g., a 64-bit atomic transfer).

To further reduce the interconnect width, it is possible to serialize the command and data phase transfers into multiple transfers of smaller NDIO 421 interconnect width to trade bus cycles for interconnect count. For instance, an 8-bit NDIO 421 can be used to transfer a 32-bit command in 4 cycles and a 32-bit data in 4 cycles. As the transfer involves multiple NDIO 421 cycles, the CPU must either wait through the serialization and/or the NDIO 421 data rate must be higher than the CPU bus rate. The same (or similar) command and data formats can be used on both sides, allowing implementations with different interconnect counts to have the same provided features as each other. Outside of additional latency on transactions, nothing on either die except the PHYs 415 and 426, I/O 355 and 360 NDIO interconnect 421 need change.

An improvement on serialization is to utilize data size information encoded into the command stage to indicate a smaller than 32-bit transfer size. For instance, if an 8 or 16-bit transfer is indicated, the number of data phase cycles can be 1 or 2 respectively for an 8-bit NDIO 421 interconnect width.

A similar improvement can be made in the command phase. By creating different length variants of the commands, the bridge can select the shortest length coding which encodes the desired transaction. For instance, commands of 16 bits, 24 bits and 32 bits can be utilized. The 32-bit variant might encode commands similarly to if 32 interconnects had been used, while the shorter ones can only encode a subset. The command can then be serialized into the number of cycles needed to transfer that command width. For example, using 8-bit NDIO 421 interconnect width, two cycles can be used to transfer a 16-bit command.

To indicate the command width to the ASIC die 271, it is possible to devote some number of bits in the first command cycle to indicate command width. For 16/24/32 width variants, this would use 2 bits of the first transfer phase for this information in three variants, leaving 14/22/30 bits of useful bits remaining for the command content. An alternate configuration could use a dedicated bit in the $2^{nd}$ cycle to indicate the need for $3^{rd}$ cycle, and use a similar bit in the $3^{rd}$ cycle to indicate the need for a $4^{th}$. This would allow for 15/22/30 bits of useful command content. A third configuration can use a dedicated signal CPU to ASIC signal NPHASE 422 to indicate continued command phase so that none of the usual NDIO 421 signals need be used for communicating command length. At the end of each command phase cycle, the ASIC die PHY 426 can inspect NPHASE 422 to determine if further command phase serialization is needed. On the first command phase cycle for which NPHASE 422 indicates non-continuation of the command phase, the ASIC die 271 can know the command width and move to the data phase (provided the command indicates a data phase).

NRESP 423 is an ASIC to CPU response signaling path synchronized to the NDIO 421 command/data phases. Typical width for NRESP 423 can be 3 bits. In serialized versions this can be reduced to 2 (such as when using 16, 8 NDIO wires) or 1 (such as when using 4 or less NDIO wires). During the data phase, NRESP 423 is used to provide indications from the ASIC to the CPU to provide information other than the bus data. For instance, for the ASIC peripheral to indicate a bus error, an ERR response could be provided on the same bus cycle as when the data would transfer. To indicate a successful transaction an OK response could be provided on the same cycle as the data. For slaves which require more time before being able to transfer data, a STL response could be provided, which will then delay the data phase to the next cycle. Other relevant information which should be delivered from ASIC to CPU as part of the data phase can also be encoded.

An example of a 3-bit (single cycle) encoding for NRESP is shown below in Table 1.

TABLE 1

| Coding | Name | Meaning |
| --- | --- | --- |
| 100 | STL | ASIC peripheral not ready to complete data phase this cycle |
| 001 | OK | ASIC peripheral accepted the transaction |
| 011 | OKDN | ASIC peripheral accepted transaction with DMA de-assertion hint |
| 110 | SPL | ASIC peripheral yields NDIO interconnect without transaction completion |
| 000 | ERR | ASIC peripheral indicates transaction error |
| 000 | IDL | NRESP indication during NDIO command phase |

During the command phase, NRESP 423 can be used for other purposes. As both sides of the bridge are aware of the command/data phase, the same bit pattern can be used to encode different concepts during command and data phases. Some uses for this might be to indicate an illegal command has been issued, command stall (ASIC not ready to receive new command), and event like indications such as a particular kind of data or operation being ready.

For cases where the NDIO 421 signaling is serialized into multiple cycles, it can be possible to also serialize the NRESP 423 signaling. For instance, two bits might be used for NDIO 421 with 8 interconnects. They might be coded as shown below in Table 2.

TABLE 2

| $1^{st}$ Cycle | $2^{nd}$ Cycle | Meaning |
|---|---|---|
| 00 | <N/A> | STL. Data will actually begin next bus cycle |
| 01 | <N/A> | OK. ASIC peripheral accepted the transaction |
| 11 | <N/A> | OKDN. ASIC peripheral accepted transaction with DMA hint |
| 10 | 00 | SPL. Peripheral yields bus |
| 10 | 10 | ERR. Peripheral indicates access error |
| 10 | <N/A> | IDL. NRESP indication during NDIO command phase |

In this coding, one special response STL can only be used on the first data cycle as a special code to restart the data on the next bus cycle as the ASIC is not yet ready to transfer the data. Two of the other responses fully indicate the response code on that cycle. The $4^{th}$ code is used to indicate an additional cycle is needed to disambiguate amongst various other response possibilities. A $2^{nd}$ bus cycle must then be used for the data phase to deliver this response (even when the data phase might have completed on the first cycle, such as for an 8-bit transfer on an 8-bit NDIO). By encoding only the rare responses using the longer serialization, additional data phase latency can be mostly avoided while saving the interconnect required to signal possible responses in the $1^{st}$ bus cycle.

It is also possible to implement the transaction interconnect NDIO 421 and NRESP 423 with as few as two wires in cases where extremely low-cost implementations are desirable. In one implementation, NDIO 421 can have an idle state such that the start of a serialized NDIO 421 command could be indicated by a start bit. After the start bit is transmitted, the remainder of the NDIO 421 command can serialize. In one implementation, the number of command bits to serialize can be a fixed number so that the ASIC die 271 can determine the end of the command phase by counting the number of received command bits after the start bit. An improvement can use variable length command phase, where coding in the earlier bits of the command phase can indicate the total number of command bits and their meanings. After the command phase, the data phase can serialize using one clock cycle per bit. The data phase can then proceed by serializing the number of bits indicated by the command phase command in the data direction indicated by that command. NRESP 423 can also be serialized over a single wire. After the command phase, the NRESP 423 bit at the beginning of a read transaction data phase can indicate whether to stall, such as by indicating a high level on NRESP 423 for stalling. If there is no stall required, the first data phase cycle of NRESP 423 can indicate the non-stalling level and the data phase can begin serializing on that cycle. If a stall is required, the ASIC die 271 stalls for the number of cycles necessary for data to become available by driving NRESP 423 with the stalling level. Then the stall can be removed by driving the non-stalling level so that the data serialization can begin. During the data serialization, the various different codings of NRESP 423 can be serialized by different sequences of subsequent bits. For a write transaction, the stalling mechanism can instead extend the last data phase serialization cycle in a similar manner.

Using similar mechanisms, any number of wires no less than two can be used for the transactional interconnect while preserving the bridging features, so as to make tradeoffs between bridging latency and interconnect count.

The transaction interconnect bridging can be improved by adding burst support. Many bus protocols including AHB provide support for burst transfers, where a series of related addresses are transacted in sequence. This is often used by cache controllers and DMA controllers 212. It is also possible in rare cases for the CPU itself to initiate transactions against sequential addresses on consecutive clock cycles, whether as an explicit burst or just in the same sequence as a burst. Furthermore, some bus slaves can implement a FIFOing address each access to the same memory address is translated by the slave into FIFO enqueuing/dequeuing for write/read accesses respectively. For this kind of slave, it is common to have several sequential accesses to this same address when it is desired to enqueue/dequeue multiple FIFO items in a burst. When implemented by a DMA controller 212, this burst with non-incrementing address would be part of the DMA channel configuration. If done directly by the software, this would only be apparent after the fact by observing the sequence of bus transactions issued by the CPU. In these cases, it is desirable to provide mechanism(s) to use the NDIO 421 interconnect to perform multiple related data transfers in response to only a single command transfer. Otherwise, after every data transfer, the NDIO interconnect would have to be used to provide a command phase for the next transaction in the burst, cutting the NDIO 421 transfer rate for the burst in half.

To achieve burst transfers, an additional CPU to ASIC interconnect signal NPHASE 422 can be introduced. This signal indicates to the slave whether the next interconnect clock cycle is expected to be data phase. The ASIC die 271 receives this signal, and when asserted during a data phase it understands that the next interconnect bus cycle should be a burst continuation from the current data phase. It then can issue a new command phase on its bus master interface 436 or 437 to continue the burst without requiring an additional command phase indication on NDIO 421. To allow stalls to be properly handled, for data phases where NRESP 423 is STL, both CPU die bridge 350 and ASIC die bridge 365 continue the data phase whether NRESP is asserted or not. This is because the data phase must be extended past this slave stall whether a burst would continue or not. The command phase on NDIO 421 can provide information about how to adjust the bus transactions from one burst transaction to its continuation. As it is more common to have incrementing transactions, the default command format can default to this behavior. Note that incrementing typically means adding the address by an appropriate amount to advance past the previous address by the size of each transfer. So, for instance, if 16-bit transfers are indicated on an AHB bus using HSIZE, the increment of an address from the previous one would be adding 2 to it, as AHB uses byte addressing. Command variants can be provided to indicate other types of update behaviors such as non-incrementing transactions for FIFO addresses, or wrapping transactions for cache-like operations.

The CPU die bridge 350 can also be configured to provide access to multiple AHB masters, such as by providing multiple AHB slave ports on the CPU die bridge 350. An example implementation provides a bus slave interface for a bus mastered by a CPU via AHB interface 405 and another for a bus slave interface mastered by a DMA controller via AHB interface 406.

To arbitrate the transactional interconnect between transactions issued by the CPU on AHB interface 405 and additional bus master on AHB interface 406 and special BUS transactions unrelated to memory-mapped transactions such as PMU interface 404 and DMA interface 407, an arbiter 418 can be provided. As various of these services request access to the transactional interconnect for transactions, the arbiter can prioritize one of the sources over the others in case of contention. It can do this by strict prioritization, by round-robin servicing, by guaranteed maximum latency scheduling, by a combination of these techniques, or by other suitable methods. The selected service can then be allowed access to PHY 415 using interface 457. In some implementations, the CPU can have influence over the arbitration method by being provided special function registers in its configuration SFR (register) bank 417. When multiple services request access, the services which are temporarily denied access by the arbiter 418 can be provided stall indications to delay the requested transaction of the service until servicing is provided.

For implementations where the CPU die bridge 350 is configured to act as slaves on multiple buses such as 405 and 406, it can be possible that a slow peripheral on the ASIC die 271 can unnecessarily stall the completion of a transaction on the AHB bus 437 on the ASIC die 271. This would create the situation where NRESP 423 would indicate STL for multiple cycles, occupying the transactional interconnect without making any progress on data transfers. To improve performance in such cases, the ASIC bridge 365 can implement additional bus master port 436 to master a $2^{nd}$ ASIC die AHB bus. If the transaction on AHB bus master 437 would take a number of cycles to complete, an NRESP 423 indication of SPLIT can be indicated during an NDIO 421 data phase for that transaction. This indication causes the CPU die bridge 350 to end the interconnect BUS transaction without resolving it. The ASIC die bridge 365 continues to master this paused operation on its AHB bus master interface so that the operation can continue on AHB bus 437, storing the AHB transaction result in its memory whenever the bus slave completes the transaction. Meanwhile the arbiter 418 is able to issue another NDIO 421 command phase for an unrelated transaction. Were such a transaction to occur and this transaction was targeting an AHB bus slave, this transaction could be issued by the ASIC die bridge 365 as a bus operation sing its alternate bus master interface 436. At some suitable point, the arbiter 418 can issue an NDIO 421 command variant JOIN to resume the data phase for the previously paused transaction. If the transaction on bus master 437 has completed successfully by this time, then the data phase response is delivered from the results stored in the memory of the bridge. If the transaction on bus master 437 is still pending then the data phase resumes similarly to if the SPLIT had never occurred.

Transactions using the transactional interconnect provides sufficient mechanism(s) for the CPU die 246 to initiate associated interactions with the ASIC die 271. In certain cases, the ASIC die 271 may initiate its own interactions. For this reason, an event relay using NEVT interconnect 424 is used. NEVT 424 is driven by the ASIC die 271, which it can use to transmit messages to the CPU die 246. These messages are typically in the form of selections from an enumerated pre-defined set. Typical messages can indicate interrupt activity on the ASIC die 271, DMA request activity on the ASIC die 271, PMU state change on the ASIC die 271, etc. For cases where the ASIC die 271 should further provide a non-enumerated data as part of the interaction, coordination with the recipient of the event through the transactional interconnect can schedule a payload delivery. Alternatively, it is possible to provide an enumerated preamble followed by a number of cycles of arbitrary data transferred over NEVT 424.

Due to the relatively large number of potential enumerated events, the NEVT 424 signaling can be implemented as serialized messages in order to keep the number of NEVT 424 interconnects small. In an example implementation, NEVT 424 can be implemented with, e.g., 5 wires and event messages serialized using two consecutive clock cycles of transfer. An exception is a special coding (e.g., all zeros) which is the single cycle pseudo-event IDLE, indicating no event. Under this coding, there are 31 possible values for the $1^{st}$ cycle of NEVT 424 transfer and 32 possible values for the $2^{nd}$ cycle, for a total number of 992 possible events. Other implementations with different numbers of wires and different serialization lengths can be used to optimize the tradeoff between number of wires, latency of serialization, and number of possible events. It is also possible to use variable length event codings so that more commonly used events and/or events desiring lower latency can be indicated with shorter serialization lengths, while still allowing longer serialization lengths to increase the number of possible events which have the penalty of longer serialization. Another implementation uses only one wire with a start bit and a N bit sequence to transfer as many as $2^N$ different events. To avoid possible problems with lack of synchronization, the N-bit sequence can be coded to avoid sequences with multiple trailing zeros so that a guardband between one sequence and another to resynchronize can be minimized.

In one embodiment, EVENT transfers can optionally be serialized to increase the number of possible events. In one implementation, 5 wires can provide 256 events by using one of the wires as a $1^{st}/2^{nd}$ transfer stage indication and the other 4 as $1^{st}$ and $2^{nd}$ nibbles of data. In another embodiment only one wire is used, with a start bit and a N bit sequence to transfer as many as $2^N$ different events. To avoid possible problems with lack of synchronization, the N bit sequence can be coded to avoid sequences with multiple trailing zeros so that a guardband between one sequence and another to resynchronize can be minimized.

In cases where EVENT latency/bandwidth can be less important than lower interconnect count, it is possible to use a single set of interconnects to perform both NRESP 423 and NEVT 424 functions. This can be done by making the purpose of the shared NEVT 424/NRESP 423 interconnect be a function of the transaction state for transaction interconnect 460. During times when NRESP 423 indication is required to form a data phase response, both bridges can use the shared NEVT 424/NRESP 423 interconnect for NRESP 423 communication. If an NEVT 424 event is being serialized when this occurs, both bridges can understand to pause the NEVT 424 serialization for the duration of NRESP 423 communication. Once the NRESP 423 content has been communicated, both bridges can resume using the shared interconnect for NEVT 424 purposes and continue serializing from the same position as when the pause occurred.

IRQ indications are propagated from the ASIC die 271 to the CPU die 246 using a combination of transaction interconnect 460 and NEVT interconnect 424. ASIC IRQ rising edges (activations) are detected by IRQ synchronization logic 431 on the ASIC die 271 and translated into NEVT 424 interconnect telegrams, events or messages to inform the CPU die 246. IRQ synchronization logic 431 can request these NEVT communications by providing requests on interface 470. As the NEVT interconnect may not be immediately available for transmission of this telegram due to other NEVT activity, IRQ synchronization logic 431 can implement a register for that interrupt to indicate need to transmit this telegram at a later time such as when NEVT arbiter/mux 430 grants this access. Receipt of such a telegram is provided to IRQ synchronization logic 451 on the CPU die 246 using indication signals 447. Upon receipt of such an indication, IRQ synchronization logic 451 can provide a single clock cycle IRQ indication on the appropriate index of its IRQ outputs on IRQ interface 475. These IRQ outputs can be provided to an interrupt controller on the CPU die 246, such as an NVIC contained in CPU 217. The CPU die 246 interrupt controller can be configured to use either edge detection or level detection for IRQ interface 475 signals to its interrupt controller. This allows the CPU to see new events on ASIC die IRQ interface 433, but by itself provides no synchronization for the IRQ signals on IRQ interface 433 being de-asserted. How de-assertion is treated depends on whether the interrupt source intends its signal to be edge-detected or level-detected.

Interrupt service requests for edge-based ASIC die 271 sources are propagated from ASIC die 271 using event messaging on NEVT 424 interconnect as described previously. As edge-based IRQ does not propagate any information on the de-assertion edge, this is a complete solution for synchronization of such interrupt sources.

Interrupt service requests for level-based ASIC die 271 sources are propagated from ASIC die 271 to CPU die 246 by a combination of NEVT 424 and transactional interconnect 460 signaling. The activation of the interrupt service request on the ASIC die 271 is propagated to the CPU die 246 similarly to the edge-based case. The IRQ indication on IRQ interface 475 will be asserted for a single cycle even though the corresponding signal on the ASIC die IRQ interface 433 may still be asserted. This causes the PENDED register for this interrupt line to be set in the interrupt controller. The interrupt controller does not require further information from the interrupt source until its PENDED register is later cleared, as it would not react differently to either level on its own interrupt service request input as provided from IRQ signals on IRQ interface 475. The CPU die bridge 350 can therefore provide an inactive signal for that interrupt on IRQ interface 475, not caring whether the ASIC die 271 interrupt service request in signals on IRQ interface 433 is active or inactive. Only after the PENDED register has been cleared does the interrupt controller re-examine its interrupt service request input. When execution of an interrupt service routine clears the PENDED register, a PEND_CLR signal for that IRQ inside the interrupt controller can be asserted for a clock cycle and an ACTIVE signal inside the interrupt controller can be asserted for the duration of the execution of that interrupt service routine. These signals can be provided from the interrupt controller to the CPU die IRQ synchronization logic 451 using IRQ hooks on IRQ interface 475. When it is the software that clears the PENDED register, this can result in the PEND_CLR signal for that IRQ inside the interrupt controller to be asserted for a clock cycle without the ACTIVE signal being asserted. The interrupt controller would only re-examine its interrupt service request input for that IRQ number when its PENDED register is not set and the ACTIVE signal is also not asserted. The IRQ synchronization logic 451 of CPU die bridge 350 can therefore register the clearing of the PENDED signal such as by observing the assertion of PEND_CLR and wait for the ACTIVE signal to not be asserted as an indication of a need to re-poll the ASIC die 271 IRQ signals on IRQ interface 433 for that interrupt to re-establish whether the interrupt source on the ASIC die 271 is asserting its IRQ. The IRQ synch can perform this repolling operation using a special command on the transaction interconnect 460 by requesting this command through arbiter 418 on request signals 449. When ASIC die sequencer/PHY 426 receives this command, it can inform the IRQ queueing/scheduling logic 431 to re-examine the appropriate interrupt request signal in signals on IRQ interface 433 and, if asserted, schedule a telegram indicating this through the NEVT 424 interconnect. Note that this telegram can have the same coding as the activation telegram previously discussed as its treatment on the CPU die 246 can be the same. Were this to occur, NEVT 424 telegram would be received using event receiver 412, provided to IRQ synch logic 451, and result in a single clock cycle assertion of the appropriate IRQ indication on IRQ signals on IRQ interface 475, causing the interrupt to be re-pended in the interrupt controller. If the interrupt was not asserted at this time, then IRQ queueing/scheduling logic 431 can await a rise edge of the interrupt signal in IRQ signals on IRQ interface 433 to provide the previously discussed activation NEVT 424 telegram.

The CPU die bridge 350 can be provided information for each interrupt indicating whether that interrupt is intended to be treated as edge-detect or level-detect. In one embodiment it can be provided this information using configuration SFR bank 417. In another embodiment, the interrupt controller can provide this information as part of its interrupt hooks on IRQ interface 475. The CPU die bridge 350 can then utilize this information to select the appropriate method for synchronizing the IRQ state for each interrupt source.

In some CPU die implementations, access to the internal signals PEND_CLR or ACTIVE of the interrupt controller may not be available. To address this case, an alternate mechanism for level-based interrupt re-polling can be provided by special function register access. A special function register can be implemented in a configuration SRF bank 417 of the CPU die bridge 350 allowing the CPU to directly request repolling for an IRQ. This can be implemented by providing the re-polling indications to IRQ synch logic 451 from appropriate accesses to configuration SFR bank 417, such as detecting write accesses in an appropriate address of configuration SFR bank 417. The software can then directly request repolling by writing an appropriate value to this special function register whenever the level-based interrupt requires re-polling. Typical cases would be after the software clears the PENDED bit for that interrupt, or at an appropriate point inside the interrupt service routine.

DMA request synchronization from ASIC 271 die to CPU die 246 can be accomplished by a combination of NEVT 424 and transactional interconnect 460 signaling. ASIC die DRQ synchronization logic 428 and CPU die DRQ synchronization logic 414 communicate through these interconnects to propagate changes in DRQ indications on DRQ signals 434 to corresponding changes on CPU die DMA signals 407, thereby providing the ability with a DMA-enabled peripheral providing a DRQ signal on interface 434 to interact with DMA controller 212 via a DRQ signal in interface 407. DRQ synchronization logics 414 and 428 can statefully propagate the changes on interface 434 to a corresponding signal on interface 407 in a manner appropriate for the signal's intent as a DMA request.

For each DRQ signal in interface 434 to be synchronized to the CPU die interface 407, CPU die DRQ synchronization logic 414 can have states UNKN, ARMD and TRIGD. ASIC die DRQ synchronization logic 428 can have states UNKN, ARMD, PEND and TRIGD. Note that although some of these states have the same names, there is no need for the state codings to be the same and there will be cases where synchronization logics 414 and 428 may not be in the same named state at any given time.

At startup or whenever the associated DMA channel is disabled, both synchronization logics 414 and 428 can be in UNKN state. When ASIC die DRQ synchronization logic 428 is in UNKN state, it expects that the CPU die has no interest in synchronizing the associated DRQ signal in interface 434. When CPU die DRQ synchronization logic is in UNKN state, it expects that the ASIC die will not inform it of any changes and provides an inactive signal to the associated DRQ signal in interface 407. Whenever CPU die synchronization logic 414 is in UNKN state and the associated DRQ is enabled for servicing, synchronization logic 414 can indicate this to ASIC die synchronization logic 428 via a transaction on transactional interconnect 460 through interfaces 448 and 465. Upon completion of this transaction, DRQ synchronization logics 414 and 428 can both enter their ARMD state for that DRQ signal.

In ARMD state, ASIC die synchronization logic 428 expects that the CPU die synchronization logic 414 is also in ARMD state and desires to be informed of any active level observed on the associated DRQ signal in interface 434. When CPU die synchronization logic 414 is in ARMD state, it provides an inactive level on the corresponding DRQ signal in interface 407, while expecting that ASIC die synchronization logic 428 is also in ARMD state and will inform it of any observed activation of the corresponding DRQ signal in interface 434.

Whenever ASIC die synchronization logic 428 is in ARMD state and an active level is detected on the associated DRQ signal in interface 434, it can enter a PEND state. When in this state, ASIC die synchronization logic 428 can attempt to schedule a DRQ activation telegram on NEVT using interface 467 via NEVT arbiter/mux 430. On completion of this telegram, ASIC die synchronization logic 428 and CPU die synchronization logic 414 can both enter TRGD state. ASIC die synchronization logic 428 can detect this telegram completion on interface 467, whereas CPU die synchronization logic 414 can detect this telegram completion on interface 454 from NEVT receiver 412.

When in TRGD state, CPU die synchronization logic 414 provides an active level on the associated DRQ signal in interface 407, expecting that DMA controller 212 can respond by taking appropriate responsive actions. When in TRIGD state, ASIC die synchronization logic 428 expects that CPU die synchronization logic 414 is also in TRIGD state and desires to be informed of any deactivation of the associated DRQ signal in interface 434.

DMA controllers can require cycle-accurate updates to the DMA request line which has initiated its responsive bus transactions. In case of variable length data to be read from a DMA slave, this can be used to terminate a transfer after data has been delivered. In other cases, it can be because the DMA controller is completing the required transfers responsive to a previous DMA request and propagation delay from the DMA request de-assertion of the slave relative to the processing of the last bus data phase can result in falsely re-triggering a DMA operation which was not actually requested by the slave. For each DMA-responsive AHB bus transaction, it is therefore desirable for the CPU die synchronized DRQ signal in interface 407 to arrive with the same latency as the synchronized response signals on CPU die AHB interface 405 or 406. In this way, the relevant signals in combined interfaces 405/406/407 on the CPU die cycle that DMA controller 212 completes its data phase are the same as for corresponding signals in interfaces 437/436/434 for the ASIC die cycle wherein the data phase of the corresponding AHB transaction data phase completes for the ASIC die DMA-enabled peripheral. To allow DRQ de-assertions to be cycle-synchronized with the AHB data phase delivery, NRESP 423 during the transactions on the transactional interconnect 460 can be used to indicate de-assertions as part of a data phase response. The DMA controller 212 can provide indication of which DMA request a particular transaction on AHB interface 405 or 406 is responsive to during its AHB address phase using DMA hooks 407, such as by providing a binary coded DRQ number as part of the address phase. The NDIO 421 command synchronizing the associated AHB transaction on transactions interconnect 460 can include this DRQ number information as part of the command coding. This information can be provided to ASIC die DRQ synchronization logic 428 via interface 465 so that it can select the appropriate DRQ signal in interface 434 for monitoring during the AHB transaction data phase on interface 437 or 436, providing indication to PHY 426 using interface 465. The PHY 426 of ASIC bridge 365 can then provide two variants of NRESP 423 coding for successful data phases, OK and OKDN. OK indicates that the data phase completed successfully and that the DMA request indicated during the associated command phase is currently active. OKDN indicates that the data phase completed successfully and the DMA request indicated during the associated command phase is currently inactive. PHY 415 of CPU die bridge 350 can detect OKDN codings on NRESP 423 during transaction interconnect 360 data phase completions and provide this information to DRQ synchronization logic 414 using interface 455, for instance by providing one signal for each of the DRQ sources 434 indicating that a transaction marked as being responsive to that DRQ has indicated an OKDN NRESP. CPU die DRQ synchronization logic 414 can react to this OKDN reception by de-asserted the associated DRQ in interface 407 and changing its internal state for that DRQ to ARMD. Similarly, whenever OKDN is delivered as a response phase on NRESP 423, ASIC die DRQ synchronization logic can change its internal state from TRGD to ARMD for the associated DRQ.

Synchronization of ASIC die 271 DRQ indication de-activations outside of a responsive AHB transaction outside of a responsive AHB transaction do not require such synchronized latency. ASIC die synchronization logic 428 can detect a deactivation of a DRQ signal with TRGD state in interface 434, which is not related to any currently in-progress transaction on transaction interconnect 460 and can attempt to schedule a DRQ deactivation telegram on NEVT using interface 467 via NEVT arbiter/mux 430. On completion of this telegram, ASIC die synchronization logic 428 and CPU die synchronization logic 414 can both enter ARMD state. ASIC die synchronization logic 428 can detect this telegram completion on interface 467, whereas CPU die synchronization logic 414 can detect this telegram completion on interface 454 from NEVT receiver 412.

Whenever CPU die synchronization logic 414 is not in UNKN state for a DRQ and the associated DRQ is disabled for servicing, synchronization logic 414 can indicate this to ASIC die synchronization logic 428 via a transaction on transactional interconnect 460 through interfaces 448 and 465. Upon completion of this transaction, DRQ synchronization logics 414 and 428 can both enter their UNKN state for that DRQ signal and the associated DRQ in interface 407 can be deasserted.

Using these mechanisms and circuit techniques, CPU die bridge 350 and ASIC die bridge 365 can provide DRQ synchronization between CPU die 246 (with DRQ synchronization logic 414) and the ASIC die 271 (with DRQ synchronization 428), synchronizing the ASIC die DRQ signals 434 with CPU die DRQ signals 407 so that a DMA controller 212 on CPU die 246 can respond to DMA enabled peripherals on the CPU die 271 as indicated by DRQ signals 434. Each of these state machines can track an internal state for each synchronized DRQ signal 434 to assist in this synchronization.

PMU state transitions and synchronization can be synchronized between the two dies using the transactional interconnect 460 and NEVT 424 inter-die interconnects. Notably, PMU event signals on PMU interface 432 may be communicated by event transmitter 429, which are received by event receiver 412 and provided as PMU event signals on PMU interface 411. These PMU event signals on PMU interface 432 can originate from ASIC die PMU 268 and PMU interface 411 signals can then be provided to CPU die PMU controller 244, thereby allowing ASIC die PMU 268 to provide updates to CPU die PMU controller 244. Any number of enumerated events can be reserved for such updates, so that each event message can provide different information. Typical such events can include reset propagation, brownout warnings, regulator ready indication, and clock speed change notifications. To allow for a larger number of extensible events, it is also possible to reserve one of the enumerations for an event which requires a subsequent transaction on the transactional interconnect to disambiguate, so that events which do not require low latency can use this common event coding and thereby not consume one of the enumerated NEVT codings.

Similarly, CPU die PMU controller 244 can communicate to ASIC die PMU 268 by transactions on the transaction interconnect 460, initiating such transactions using PMU transactions interface 404. Arbiter/mux 418 can then schedule time for this transaction for servicing by CPU die PHY 415. Then ASIC die PHY 426 can decode the transaction and provide indication on PMU transaction hooks interface 438, which can then be provided to ASIC die PMU 268. In some cases, this transaction can be treated like a CPU die to ASIC die enumerated event so that only a command phase encoding this enumerated event is required to be transacted on interconnect 460. In this case, the decoded command phase detection can be provided as information on PMU transaction interface 438 and PHY 415 and PHY 426 will both skip the interconnect 460 data phase. Other PMU command codings can imply a data phase so that additional data can be transferred between PMU controller 244 and PMU 268 using interfaces 404 and 438.

In many cases, the ASIC die 271 may contain circuitry providing power supplies to the CPU die 246, to other components also on the ASIC die 271, or to external ports. In these cases, much of the PMU logic involved with sleeping and wake up, including a WIC, can also be on the ASIC die 271. In most microcontroller architectures, sleeps are initiated by the CPU.

During a sleep sequence, the CPU provides its signaling of its intention to sleep on its PMU interface 256. On single die implementation 200 this interface 256 can directly communicate with PMU 205. For multi-die implementation, CPU die PMU controller logic 246 can intercept this signaling. It can then engage in a number of transactions on the transactional interconnect 460 to interact with the ASIC die PMU 268 to perform the sleep. For CPUs implementing a WIC, the CPU can transfer relevant parts of its NVIC state into a WIC state using its PMU interface 256, providing configuration for interrupt/exception detection logic that mirrors similar interrupt masking function in the NVIC. The CPU die 246 PMU controller 244 can instead receive this signaling and transform it into one or more transactions using transaction interconnect 460 to instead transfer the state into a WIC implemented in ASIC die PMU 268. This can allow the PMU to disable NCLK 420, a power supply or other services to the CPU die 246 during a sleep while still providing the standard wakeup mechanisms of a WIC controller. Other communications on transaction interconnect 460 and NEVT 424 can be used by this PMU synchronization logic to perform the proper inter-die sequencing to enable a multi-step handshaked sleep sequence between CPU 217 and PMU 268 through CPU PMU interface 256 in the standard way. On wakeup, similar transaction interconnect 460 and NEVT 424 transactions can perform the necessary sequence between CPI 217 and PMU 268 through CPU PMU interface 256. If the wakeup was initiated by a WIC on the ASIC die 271, the transfer of state back to the NVIC can be accomplished as part of this sequence, such as by transactional interconnect 460 transactions to read this state from the ASIC die WIC as part of the wakeup sequence. Alternately, all or some of this WIC state transfer on wakeup can be implemented using enumerated events on NEVT 424 at a suitable time during or after the wakeup sequence. For example, it can be possible to alert the CPU die NVIC of which interrupt or exception caused the wakeup by using ASIC die IRQ synchronization logic 431 to transmit the same NEVT 424 enumerated message as it would have done were this same interrupt or exception to have occurred outside of a sleep. By transferring this event at a suitable time relative to the wakeup sequence, logic on CPU die 246 can ensure that this interrupt or event is pended into the CPU die NVIC prior to CPU 217 beginning execution.

Another aspect of sleeping is proper management of the interconnect interface so that both transaction interconnect 460 and NEVT interconnect 424 are in an idle state, so that no communications on those interfaces are only partially serialized when the sleep occurs, possibly resulting in malformed transactions. Were this to occur, one die could understand that a data transfer has completed or event or handshake has been communicated whereas the other die has a different understanding. To address this, a transaction on transaction interconnect 460 can be used during the sleep negotiation to disable further new NEVT 424 activity after whatever NEVT 424 serialization which may be already in progress completes. This command can be issued automatically as part of a sleep sequence by PMU controller 244 at an appropriate time during the sleep negotiation to guarantee that when the sleep takes effect NEVT 424 messages have been delivered atomically and further NEVT 424 messages are paused. Incomplete transactions on transaction interconnect 460 can be avoided by making the last transaction on that interconnect before sleep mode is entered—a "completed transaction" with coding indicating that we can go to sleep now, which will finalize the sleep negotiation sequence. The CPU die BUS arbiter/mux 418 and ASIC die NEVT arbiter/mux 430 can then stall any requested operations through the sleep sequence and then re-enable servicing at a suitable point during a subsequent wakeup sequence.

Moreover, ASIC die 271 may include a configuration register bank 419. Security policy synchronization for a debug access port can also be synchronized using transaction interconnect and NEVT bridging. In one embodiment, a communication interface for a debug access port can be located on the ASIC die 271. An attached debugger can communicate to this interface according to policies accessed via the security manager 267 which can be set by a security manager 243 on the CPU die 246. This security policy can include whether an attached debugger is allowed access to communications with the CPU die, whether the debugger is allowed to directly access resources on the ASIC die 271, whether power state transitions can be initiated by the debugger such as during sleep modes where the CPU die may not be powered or clocked, and authorization credentials such as a challenge/response sequence to authorize a certain type of access.

A security policy can be transferred from the CPU die security manager 243 to the ASIC die security manager 267 located on the ASIC die during an initial power up sequence by using transactions on transaction interconnect 460 initiated by the CPU die security manager 243. To avoid unauthorized activity on the debug port until this policy has been transferred, a ASIC die security manager 267 can disallow access to resources with ambiguous security policy until the relevant policy has been transferred. Alternatively, ASIC die security manager 267 can disable the debugger communication interface until a policy has been provided. The ASIC die security manager 267 can maintain this policy through any CPU die 246 sleep cycles so that it can respond to debugger requests. Updates to the security policy, such as by CPU 217 software adjusting configuration of security manager 243 can be communicated to the ASIC die to update its policies using transactional interconnect 460 transactions.

Some debugger operations can initiate changes to desired CPU state, such as forcing power states and halting/unhalting CPU operation. The debug port on the ASIC die 271 can use NEVT 424 messages to initiate operations such as this, subject to the authorization of the security managers on one or both dies.

It can be useful during certain stages of the manufacturing and product development process to be able to attach a debug port to an ASIC die 271 without any connected CPU die 246. To enable this, ASIC die security manager 267 can determine that there is no CPU die 246 attached and allow a default policy of accessing all or part of the ASIC die 271 resources according to an unattached-part security policy.

It can also be useful when analyzing failed or customer returned parts to enable access to non-secure resources during failure analysis. To enable this, a default security policy can be implemented in the ASIC die security manager 267 to address cases when the security policy failed due to misbehavior of the CPU die 246.

When the CPU die security manager 243 has been enabled with lifecycle management then product lifecycle progression can be implemented. For instance, a life cycle of a part could be changed from normal operating mode to a fault-analysis mode to enable debugging of a product return. The ASIC die security manager 267 can be implemented to respond to a lifecycle state change instruction from an attached debugger. The security manager 267 and a debug interface on the ASIC die 271 can be implemented to be responsive to this communication regardless of the security policy provided by the CPU die security manager 243. The ASIC die security manager 267 can initiate a lifecycle state change using an NEVT 424 event. This event can be provided to the CPUd die security manager 243, which can then engage in BUS transactions to perform authentication on the credentials of the debugger such as by forming a challenge and verifying a response. On successful authentication, the CPU die security manager 243 can take necessary steps to perform the lifecycle change, such as by erasing sensitive non-volatile memory and writing the lifecycle state progression into non-volatile memory storing this state. Once completed, the debug port and security managers 243, 267 can use updated security policies consistent with this new lifecycle state.

Figure 5:
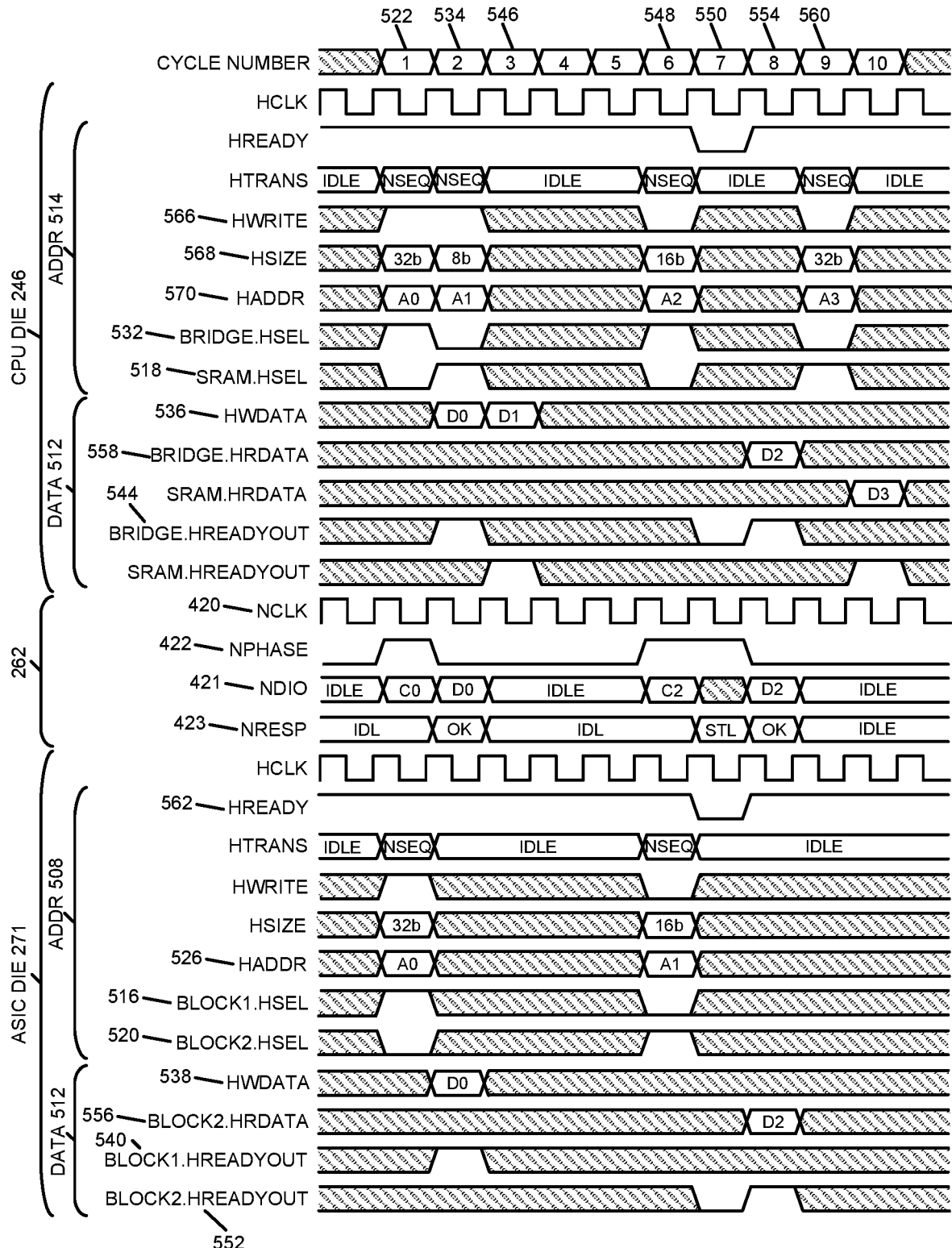
FIG. 5 is a drawing illustrating selected details of an embodiment of bus transactions.

A sequence diagram example of bus transactions using this technique is shown in FIG. 5. In this example, signals are shown for signals on the CPU die 246, the inter-die 262 signaling, and the ASIC die 271. In particular, selected signals from a CPU die AHB 330 address phase signals 514 and CPU die AHB 330 data phase signals 512 are shown. Similarly, selected signals from an ASIC die AHB 370 address phase signals 508 and ASIC die AHB 370 data phase signals 512 are shown. In this example, both CPU and ASIC are implementing AHB in data buses 248 and 277 (note that the ports where the bridges interact with AHB are 405 and 437). In this example, the CPU initiates four bus transactions against addresses A0, A1, A2 and A3. A0 is associated with a peripheral (BLOCK1) 216 on the ASIC die 271, A1 and A3 are associated with an SRAM block 518 on the CPU die 246, and A2 is associated with a peripheral (BLOCK2) 520 on the ASIC die 271. In this case, clocks are synchronized to each other and at the same rate. BLOCK1 and/or BLOCK2 are any slave peripheral located on the ASIC die.

Starting on cycle 1 522, the CPU issues an AHB transaction for a 32 bit write to address A0 on its address phase signals 514. The CPU die AHB block address decoder determines that this address is in an ASIC die 271 block address space and so activates HSEL 532 for the CPU die bridge 350 during the AHB address phase. The CPU die bridge 350 forms a command to issue on NDIO 421 as an interconnect 460 command phase with the required information (e.g., LSBs of HADDR 570, HWRITE 566, HSIZE 568, etc.). In this example we assume that the command phase signals are generated combinatorially from CPU die AHB address phase signals, but this can also be done with registration. In the registered case, the command would be issued on NDIO 421 on a later clock cycle than that for the AHB address phase of the CPU die. The ASIC die bridge 365 responds to this command by initiating a corresponding AHB bus transaction on its address phase signals 508. The AHB block address decoder on ASIC die 271 determines that the address is associated with BLOCK1 and so issues HSEL 516 for that block as part of that ASIC die AHB address phase.

On cycle 2 534, the CPU provides the write payload D0 on HWDATA 536 as part of CPU die AHB data phase signals 512 for the transaction to A0 initiated on the previous cycle. The CPU die bridge 350 receives this data and transfers it to ASIC die 271 using the NDIO 421 interconnect signals as an interconnect 460 data phase. The ASIC die bridge 365 propagates this data to its own HWDATA 538 for the BLOCK1 peripheral to use. In this case, the BLOCK1 peripheral can complete the operation during that cycle, so it asserts its HREADYOUT 540 to allow the ASIC die AHB data phase to complete. The ASIC die 271 AHB HREADY-OUT mux selects this signal to provide to the ASIC die bridge 365 for its HREADY 562. This information is propagated through the interconnect 460 by the ASIC die bridge 365 by indicating OK on NRESP 423. The CPU die bridge 350 then further propagates this to its own HREADYOUT 544 to allow the CPU die 246 AHB data phase to complete.

Also, on cycle 2 534, the CPU initiates a transaction to address A1 using its address phase signals 514. The AHB block address decoder on the CPU die 246 determines that this address is associated with the SRAM 216 on the CPU die 246, and so asserts HSEL 518 for that block during the AHB address phase. As the CPU die bridge 350 is not involved in this transaction, it ignores this transaction and continues with the previously scheduled data phase. Were a data phase not already scheduled, it would have driven IDLE pseudo-commands onto the NDIO 421 interconnect as a command phase. Had the CPU die AHB address phase on cycle 2 534 been directed to the CPU die bridge by asserting its HSEL 532, the bridge would have registered the CPU die AHB address phase signals 514 for later issuance of a NDIO 421 command phase after the already scheduled NDIO data phase has completed. The ASIC die bridge 365 has already committed to a data phase to transfer D0 and so does not treat NDIO content as a new command phase. As it has not been given a new NDIO command phase, it does not initiate any further transaction on its AHB address phase signals 508 during cycle 2 534. The SRAM transaction completes on the CPU die 246 on cycle 3 546.

On cycle 6 548, the CPU die 246 initiates a 16-bit read transaction to address A2. The CPU die AHB block address decoder determines that this address is in an ASIC die 271 block address space and so activates the HSEL 532 of the CPU die bridge on its AHB address phase signals 514. This is propagated into a command phase on NDIO 421, which is further propagated into an ASIC die AHB 370 address phase in a similar fashion to what had occurred on cycle 1 522. In this case, the ASIC die AHB block address decoder determines that address A2 is associated with the BLOCK2 peripheral and so it issues HSEL to this block.

On cycle 7 550, BLOCK2 de-asserts its HREADYOUT 552 to indicate it is not ready to complete the ASIC die AHB data phase. The ASIC die 271 AHB HREADYOUT mux selects this signal to provide to the ASIC die bridge 365 for its HREADY 562. This is propagated by the ASIC die bridge 365 through the NRESP 423 interconnect as a STL indication. The CPU die bridge 350 receives this STL indication and responds by de-asserting its HREADYOUT data phase signal 544 to indicate that the CPU die data phase is not ready to complete. As this is a read command, both bridges have reversed data direction on NDIO 421 due to the data phase being of read type so that it is the ASIC die 271 driving the interconnect during this cycle. But as the slave has not provided data as indicated by the STL indication, the data on NDIO 421 is ignored by the CPU die bridge during this cycle.

On cycle 8 554, BLOCK2 asserts its HREADYOUT 552 to indicate it is now ready to complete the data phase. It further provides the requested data on its HRDATA 556. The ASIC die AHB data phase muxes select these signals due to the previously registered address phase and provide them to the ASIC die bridge 365. The ASIC die bridge 365 propagates this through the interconnect by indicating OK on NRESP 423 and driving HRDATA 556 on NDIO 421. The CPU die bridge 350 then propagates this to the CPU AHB bus by asserting its HREADYOUT 544 and driving the data D2 on its HRDATA 558.

On cycle 9 560, the CPU issues a read transaction to address A3. The AHB block address decoder determines this is associated with the SRAM 518 and so issues HSEL to that block. The CPU and ASIC bridges 350 and 365 have already reverted to the command phase for transaction interconnect 460 signaling, restoring the original CPU to ASIC data direction on the NDIO 421 interconnect. As the HSEL to the CPU die bridge 532 is not asserted, the bridge has been provided nothing to transact, and so it issues an IDLE pseudo-command on NDIO. The ASIC die bridge receives this IDLE command and interprets it as indicating nothing to transact, and so it issues no address phase on its AHB address phase signals 508.

In this example many signals have been shown to be generated combinatorially from other signals so that AHB signals 514, 512, 508 are propagated to/from interconnect 262 signals on the same cycle when sequencing allows for it. It should be apparent that one or more of these signal transfers can be done in a registered fashion so that the generated signal is provided on a later cycle than the source signals, such as to allow NCLK 420 frequency to be higher while still maintaining signal timing.

Similarly, in this example the number of signals in interconnects 262 is sufficient to transfer the required amount of command and data phase content in a single cycle. Were a smaller number of interconnects used, multiple NCLK 420 cycles could be used to transfer the required content in a number of serialized cycles.

Throughout this sequence, the CPU die 246 and the software running on it does not need to provide special treatment to the BLOCK1 and BLOCK2 peripherals. From the perspective of the CPU die 246 AHB bus, transactions were issued and responded to in the usual way. It is only necessary to allocate the bus addresses of BLOCK1 and BLOCK2 peripherals so that the AHB block address decoder on the CPU die associates these addresses with the CPU die bridge 350 block address space. It is not even necessary to have awareness of the components implemented on the ASIC die 271 during the specification of the CPU die 246. As the ASIC die 271 implements its own AHB block address decoder to provide the HSEL signals to its various AHB slaves, it is sufficient to allocate a large block of addresses to the ASIC die 271 in the AHB block address decoder of the CPU die and let the ASIC die 271 handle the remainder of the block address decoding. This can allow the CPU die 246 to be generic so that a single CPU die 246 implementation may be able to be mated with multiple different ASIC dies.

Furthermore, the peripherals on the ASIC die 271 also do not require special treatment due to their being implemented on the ASIC die 271. From the perspective of the ASIC die peripherals, they are connected to a standard AHB bus 370 and can operate according to usual AHB protocols.

To handle the case of software initiating a transaction against an unimplemented address in the ASIC die 271, the block address decoder (or peripheral) can provide HRESP indication of error during the ASIC die data phase. This can be propagated through NRESP 423 as an ERR indication which the CPU die bridge 350 can propagate through its own HRESP to a CPU die AHB bus 330. From the perspective of the CPU and the code running on it, the behavior is the same as if its own block address decoder had determined the address did not match any of the implemented AHB slaves. Furthermore, bus transactions can be illegal due to insufficient security authorization. In an AHB system, this can be a bus access with HPROT.PRIVILEGED 612 de-asserted, which typically indicates access by user-privilege code, accessing an address in a bus slave which is only legal for access by kernel privilege code. Furthermore, an access with HNONSEC asserted attempting to access an address in a bus slave which is only legal for accesses with HNONSEC not asserted should generate a transaction error. In these cases, the bus slave on the ASIC die 271 can be provided the usual AHB signal by the ASIC die bridge 365, which it can then respond to as it deems appropriate, such as by issuing a bus error using HRESP 423.

Figure 6:
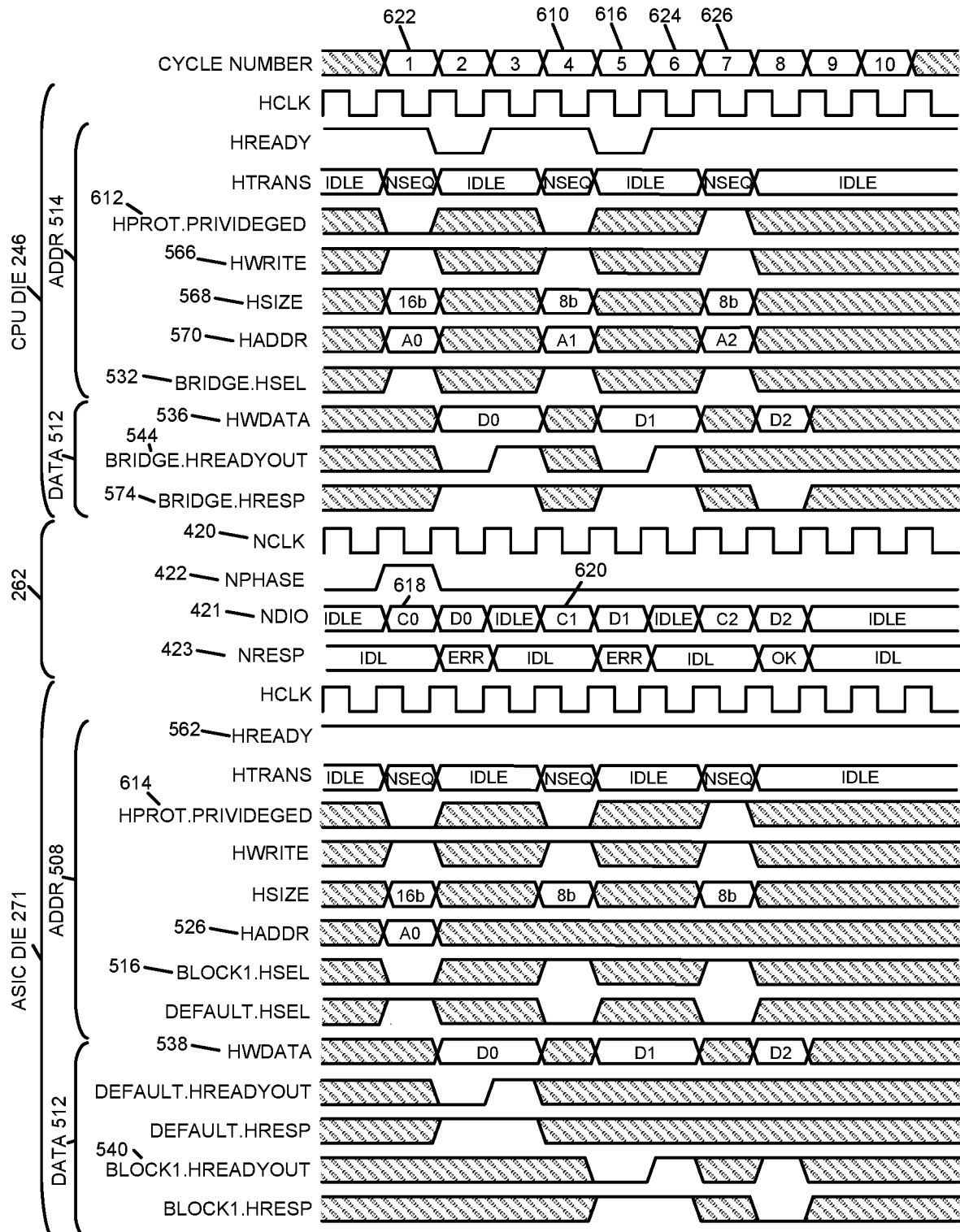
FIG. 6 is a drawing illustrating selected details of an embodiment of bus error propagation and secured bus accesses.

A sequence diagram example of bus error propagation using this technique is shown in FIG. 6. In this example, the CPU initiates three transactions, two of which complete with an error response. On cycle 1 622, the CPU initiates a write transaction to address A0, which is assigned to the ASIC die block address space, so the HSEL 532 of the CPU bridge is activated during the CPU AHB address phase on cycle 1 622. The CPU die bridge 350 composes a command CO 618 to present to the NDIO 421 interconnect. The ASIC die bridge 365 further propagates this into an AHB transaction address phase on the ASIC die AHB bus. The block address decoder in the ASIC die 271 fails to associate this address with any implemented bus slave and so the HSEL of the AHB default slave is activated. The default slave performs a two-cycle error response by activating its HRESP data phase indication and performing a bus stall using its HREADYOUT, as required by AHB specification. The HRESP and HREADY signals are provided to the ASIC die bridge 365 using usual AHB data phase multiplexing. The ASIC die bridge 365 uses NRESP 423 signaling to indicate ERR to indicate that the data phase completes with error. The CPU die bridge 350 then performs its own two-cycle error response using its HRESP 574 and HREADYOUT 544 signals to complete this CPU die AHB transaction with error.

On cycle 4 610, the CPU initiates another bus transaction. In this case the address matches a bus slave BLOCK1 516 on the ASIC die 271, but that bus slave is configured to disallow non-privileged access. The CPU initiates a AHB transaction address phase oncycle 4 610, indicating that this is an unprivileged access using the PRIVILEGED 612 bit of HPROT 612. The block address decoder on the CPU die 246 detects that this address is associated with the CPU die bridge 350 and so the HSEL 532 of the CPU die bridge is activated. The CPU die bridge 350 propagates this into a NDIO 421 command phase C1 620. The command phase content includes information that the PRIVILEGED 612 bit is not set. The ASIC die bridge 365 propagates this into an ASIC die AHB transaction, with the PRIVILEGED bit of HPROT 614 not activated. It activates HSEL for BLOCK1 516 as its block address decoder matches this address with BLOCK1. BLOCK1 516 is configured to respond with error in cases of non-privileged accesses and so it implements an ERROR response in the data phase during cycles 5 616 and 6 624. This is propagated to the ASIC die bridge 365 through the usual AHB data phase muxing. The ASIC die bridge 365 indicates ERR on the NRESP 423 interconnect, which the CPU die bridge 350 detects and implements a two-cycle error response to the data phase of the CPU die AHB bus.

On cycle 7 626, the CPU issues another transaction to BLOCK1 516, but this time with the privileged bit set. The command relayed through NDIO 421 C2 includes this information. The ASIC die bus initiates this transaction with its own HPROT PRIVILEGED 614 bit set, and so the BLOCK1 slave completes the transaction without error. This is indicated back to the CPU die 246 using the OK NRESP 423 indication, which the CPU die bridge 350 responds to by completing the CPU die AHB data phase without error.

Figure 7:
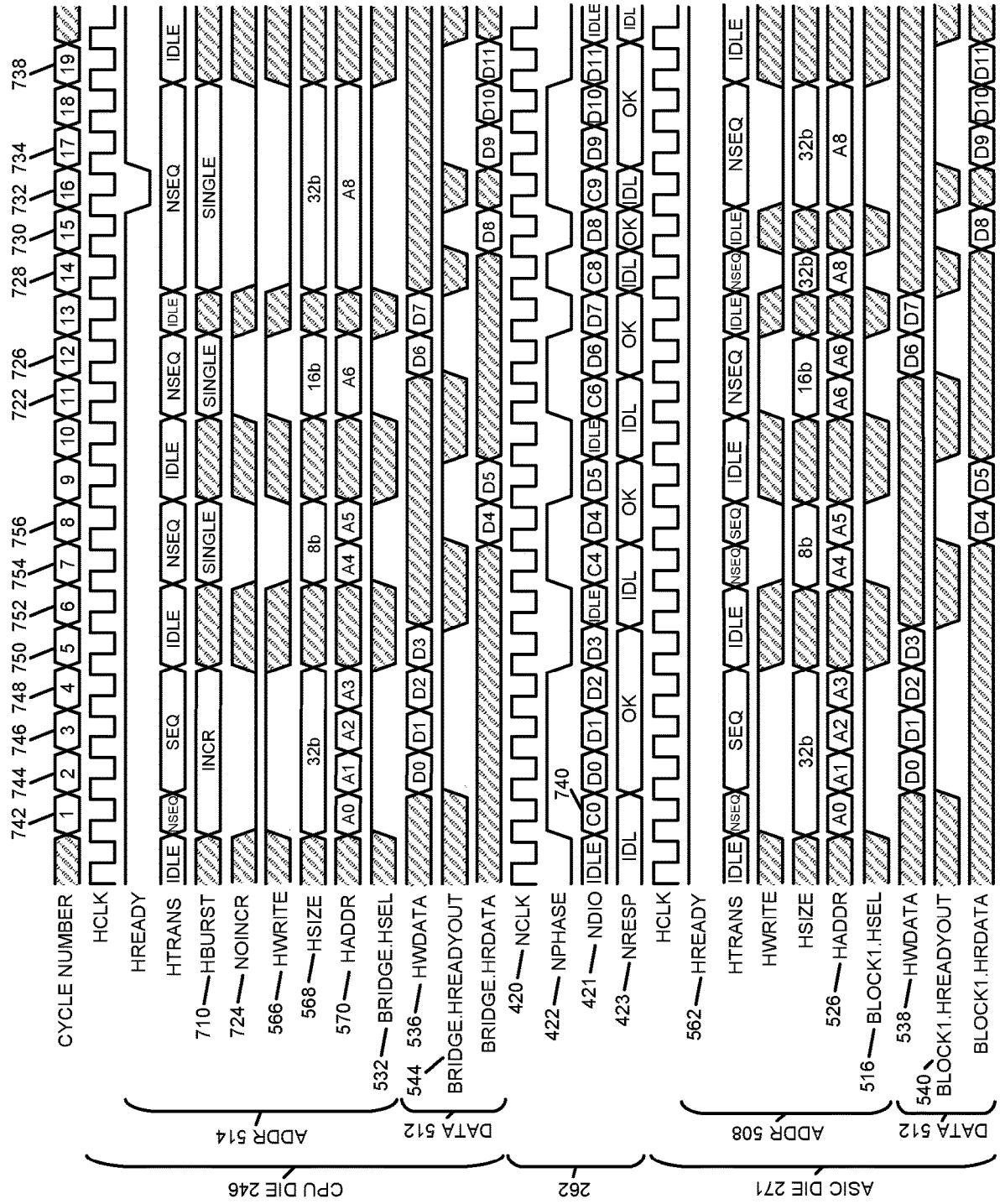
FIG. 7 is a drawing illustrating selected details of an embodiment of handling various bursts.

FIG. 7 depicts an example sequence diagram with various bursts. The first burst is a sequential transaction with explicit AHB burst indication. The AHB bus master on the CPU die 246 issues a transaction on cycle 1 742 using HBURST 710 of INCR starting from bus address HADDR 570 A0. The address A0 is determined to be in an ASIC die 271 block address space by the block address decoder of the CPU die, so the HSEL 532 of the CPU bridge is asserted during the AHB address phase. The CPU die bridge 350 receives the various AHB address phase signals and forms a NDIO 421 command phase CO 740. As HBURST 710 was indicated to be INCR, the command CO 740 is formed to indicate to the ASIC die bridge 365 that were a burst to occur, the address of each transfer should increment from the previous one. As this is the most common case, the command coding could be structured so that if no other burst type were to be indicated then this could be assumed as the default behavior. Were HBURST 710 to be some other AHB burst type, e.g., WRAPS, then CO 740 could be coded to provide this indication instead. On cycle 2 744, data word D0 is transferred as usual. Also, on cycle 2 744, the CPU die bridge 350 receives another AHB command which is consistent with a burst continuation and so asserts NPHASE 422 to indicate a burst continuation of the data phase. The consistency check can include verifying that the HADDR 570 is properly incremented, and that HWRITE 566 and HSIZE 568 match the previous transfer. The ASIC die bridge 365 detects that NPHASE is asserted and so forms a pipelined address phase on its AHB bus to indicate a burst continuation with updated HADDR 526 and optionally updated HTRANS (not numbered). It does this even as the NDIO interconnect is transferring data D0 and so is not used to provide another command phase on this cycle. The desired AHB transaction on the ASIC die is inferred from the previous CO 740 command and burst continuation as indicated by NPHASE. Then on cycle 3 746, data D1 is transferred over NDIO 421 to complete the $2^{nd}$ data phase in the burst. This continues similarly on cycles 4 748 and 5 750, except that on cycle 5 750 the AHB master does not issue a transaction and so NPHASE 422 is not asserted during that cycle. As NPHASE 422 had not been asserted on cycle 5 750 and the cycle 5 750 data phase NRESP 423 was not STL, the NDIO 421 interconnect in cycle 6 752 is understood by both bridges to be reserved for a command phase. Had another CPU AHB transaction targeting the ASIC die 271 been initiated during cycle 6 752 or had a CPU AHB transaction unrelated to the ongoing burst been initiated during cycle 5 and queued for later transaction in the CPU die bridge 365, then a command for that transfer could have been issued on NDIO 421 during cycle 6 752. In this example, no such transaction was indicated, so the pseudo-command IDLE is issued on the NDIO 421 interconnect.

On cycle 7 754, an AHB master on the CPU die 246 initiates an AHB transaction to an ASIC die slave with SINGLE HBURST 710, indicating that this transaction is not likely part of a burst. The ASIC die bridge 365 forms a command C4 to begin bridging that transaction to the ASIC die 271. The command C4 can be coded to indicate a default burst type, even though none has been explicitly indicated by the bus master. During the subsequent data phase on cycle 8 756, the CPU die AHB initiates another AHB transaction which happens to be consistent with the already issued default burst type of command C4. In this case, the ASIC die bridge 365 can infer a burst and issue NPHASE 422 on cycle 8 756 to transform the individual transactions into a NDIO 421 burst.

On cycle 11 722 a DMA controller 212 on the CPU die 246 initiates the first AHB transaction in a series of FIFO transactions to the same address A6. The DMA controller 212 can provide an extra signal NOINCR 724 to the CPU die bridge 350 as a hint to issue an NDIO 421 command C6 indicating that burst continuation should use the same bus address for each transfer. On cycle 12 726, the DMA controller 212 issues the next transaction in this sequence. The CPU die bridge 350 can verify the consistency of this new transaction with a valid burst continuation of the current command C6 and assert NPHASE 422 to continue the non-incrementing burst. ASIC die bridge 365 forms this into a cycle 12 726 address phase on its AHB bus indicating a transaction to the same address as the previously issued one.

On cycle 14 728, a CPU die bus master initiates a first transaction in a series of FIFO transactions to the same address A8. In this case it fails to indicate NOINCR 724, resulting in the CPU die bridge 350 forming an NDIO 421 command phase C8 with a default bursting type which is not the same as non-incrementing. During the data phase on cycle 15 730, the CPU die bus master initiates a second transaction which the CPU die bridge 350 determines to be consistent with a different burst type than what it had previously indicated on command phase C8. In this case, the CPU die bridge 350 detects that the observed AHB sequence is consistent with a non-incrementing burst. As the NDIO 421 command C8 is not consistent with the inferred burst type, the CPU die bridge 350 de-asserts NPHASE 422 on cycle 15 730 to return the NDIO 421 interconnect to command phase for the upcoming cycle 16 732. During cycle 16 732 it issues an updated NDIO 421 command C9 to indicate the inferred non-incrementing burst type. During this cycle, the CPU die bridge 350 de-asserts its HREADY-OUT 544 to stall the data phase of the CPU die AHB bus while the new command C9 is issued on NDIO 421. Then for cycles 17 734 through 19 738 the remainder of the burst can continue without interruption as each command received on the CPU die AHB bus 405 is consistent with the bursting type indicated by C9 and therefore NRESP can be used to continue the burst.

Figure 8:
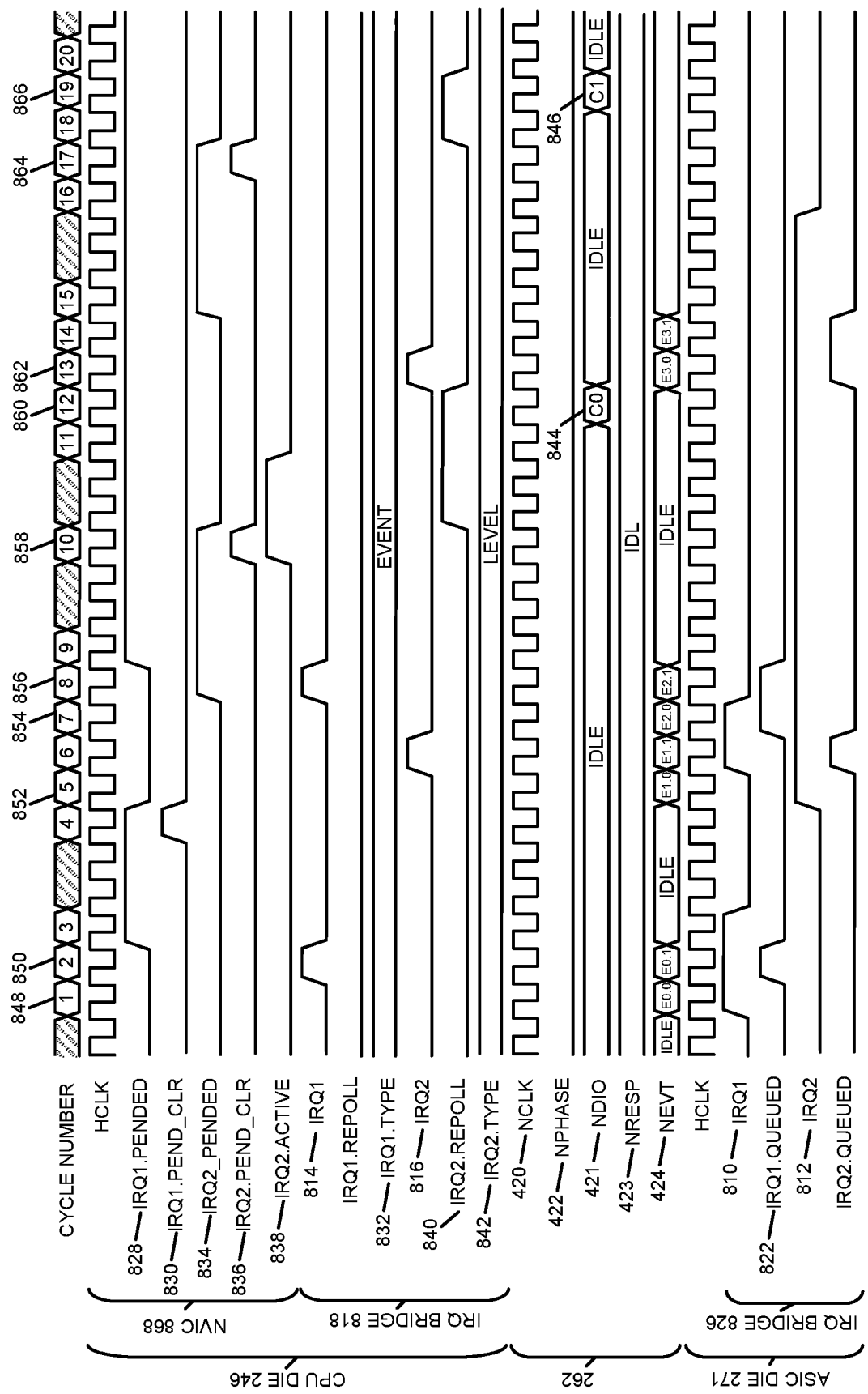
FIG. 8 is a drawing illustrating selected details of an embodiment of an interrupt bridging between interrupt sources on an ASIC die and an interrupt controller on a CPU die.

FIG. 8 depicts a sequence diagram showing interrupt bridging between interrupt sources on the ASIC die 271 and an interrupt controller on the CPU die 246. In this example, two interrupt sources on the ASIC die 271 produce interrupt indications IRQ1 810 and IRQ2 812 on that die. The IRQ1 interrupt source uses edge-based indication while the IRQ2 source uses level-based indication. The interrupt controller on the CPU die 246 is configured to accept indications IRQ1 814 and IRQ2 816 from the bridge 818 (which is a group of interface signals between CPU die bridge 350 and the other components in CPU die 246). As the CPU die bridge 350 provides only single-cycle indications on these interrupt request lines, the CPU die interrupt controller can be configured to accept these as either level-based or edge-based indications. The CPU die bridge 350 is provided TYPE indications for these two interrupt sources, which can be EVENT or LEVEL. EVENT indicates that the ASIC die 271 interrupt source is using edge-based signaling and so to treat each interrupt activation as a simple event. LEVEL indicates that the interrupt source is using level-based signaling, indicating the need to repoll the interrupt request of the ASIC die in response to the associated PENDED register being cleared in the interrupt controller.

On cycle 1 848, the ASIC die 271 ASIC die IRQ1 810 line is asserted by the interrupt source. The ASIC die interrupt bridge detects the 0 to 1 sequence and determines the need to propagate the interrupt rising edge to the CPU die 246. It requests the NEVT 424 transmitter 429 to propagate the appropriate enumerated event to the CPU die 246, while also registering the need to propagate this event in its own QUEUED register for that IRQ 822. As the event bridge is idle, it can immediately begin serializing this event on NEVT 424 using the two-clock sequence E0.0 and E0.1 to form the serialized event E0. Additionally, the ASIC die NEVT 424 serializer 429 indicates completed messaging of E0 to the ASIC die IRQ bridge 826 (which is a collection of signals from ASIC bridge 365 to ASIC die 271), so it clears its QUEUED register for IRQ1 822 as the required message has been sent. On cycle 2 850, the CPU die bridge 350 detects an E0 event reception which it determines to be encoded as the event for IRQ1 814 assertion. It then drives the CPU die 246 IRQ1 814 signal for a single cycle. The interrupt controller registers this indication into a pending register for IRQ1, IRQ1.PENDED 828 in NVIC 868. Depending on the configuration of the interrupt controller, this PENDED configuration can result in execution of an interrupt service routine or can simply be available to the software for reading. Either way, once the interrupt has been handled to the CPUs satisfaction, the PENDED indication can be cleared by the CPU asserting the IRQ1.PEND_CLR 830 signal. Inside the interrupt controller, this results in clearing of the IRQ1.PENDED 828 register. This PEND_CLR signal is made available to the CPU die bridge 350. The bridge notes that its IRQ1.TYPE 832 is EVENT and so ignores this indication as there is no need for further action.

On cycle 5 852, the ASIC die 271 IRQ2 812 source activates its interrupt request. The ASIC die bridge 365 responds similarly to its response to IRQ1 on cycle 1 848, resulting in a serialized NEVT 424 message E1 to the CPU die 246. The CPU die 246 responds similarly to the previous E0 message, ultimately resulting in the IRQ2.PENDED 834 register in the interrupt controller being set via a single cycle activation of the IRQ2 signal 816 on the CPU die.

While E1 is still serializing, the IRQ1 810 source on the ASIC die 271 activates its interrupt request. In this case, the NEVT 424 interconnect is busy serializing E1 and so the IRQ bridge 826 on the ASIC die 271 only sets its IRQ1.QUEUED 822 register to remember to serialize this later. On cycle 7 854, the NEVT 424 interconnect becomes available and so the ASIC die 271 NEVT 424 serializer begins serializing E2 to indicate this IRQ1 810 activation event at the request of the ASIC die 271 IRQ bridge 826. Note that E2 can have the same coding as E0 as it represents the same interrupt activation as for E0. On cycle 8 856, this event serialization is completed, resulting in the IRQ1.PENDED 828 register in the interrupt controller being set via a single cycle activation of the IRQ1 signal 814 on the CPU die and also causing the IRQ1.QUEUED 822 register to be cleared due to the NEVT 424 serializer reporting successful event transmission.

On cycle 10 858, the CPU enters the interrupt service routine for IRQ2 816, causing the IRQ2.PEND_CLR 836 and IRQ2.ACTIVE 838 signals to be asserted. The CPU die 246 IRQ bridge 818 notes the PEND_CLR assertion and that IRQ2.TYPE is set to LEVEL and so sets its IRQ2.REPOLL 840 register. As the IRQ2.ACTIVE 838 signal is set inside the interrupt controller, it should not yet perform the repoll, so it takes no further action on this cycle. On cycle 11 860, the IRQ2.ACTIVE 838 signal is de-asserted in the interrupt controller. As the CPU die 246 IRQ bridge 818 now has its IRQ2.REPOLL 840 register set at the same time that IRQ2.ACTIVE 838 is not set, it requests use of the transaction interconnect 460 to send a special transaction indicating the need for the ASIC die 271 IRQ bridge 826 to re-examine its IRQ2 812 interrupt indication and generate another NEVT 424 event if that signal is currently high. This interconnect 460 transaction CO 844 is performed on cycle 12 860. The IRQ bridge 826 on the ASIC die 271 responds to reception of this transaction by re-examining its IRQ2 812 input indication. Because IRQ2 812 is asserted, it sets its IRQ2.QUEUED register and requests serialization of event E3 to indicate to the CPU die 246 that the interrupt source is currently active. In the example, the NEVT 424 interconnect is not busy and so E3 serialization can begin on cycle 13 862. Note that it is possible to encode E1 and E3 using the same enumeration as the CPU bridge 350 does not need to treat them differently. The reception of E3 results in the IRQ2.PENDED 834 register being set via signaling on IRQ2 816 in a similar manner as for event E1.

On cycle 17 864, the IRQ2.PENDED 834 register is cleared by software. This causes the IRQ2.PEND_CLR 836 signal to be asserted without the IRQ2.ACTIVE 838 bit signal being asserted. The CPU die 246 IRQ bridge 818 sets its IRQ2.REPOLL 840 bit due to IRQ2.PEND_CLR 836 being active and IRQ2.TYPE 842 being LEVEL. As IRQ2.ACTIVE 838 is not set, it can immediately request a transaction interconnect 460 transaction to repoll the IRQ2 812 interrupt source on the ASIC die 271. This causes transaction C1 846 which can have the same coding as C0 844 to be transacted on cycle 19 866. The ASIC die 271 IRQ bridge 826 responds to reception of C1 846 by inspecting its IRQ2 812 interrupt request input and taking no further action due to it not being asserted. The CPU die 246 does not receive any interrupt activation message and so the IRQ2.PENDED 834 register remains unset. At some later time when the ASIC die 271 IRQ2 812 interrupt source activates again, the ASIC die 271 can indicate this to the CPU die 246 in a similar manner to the E1 NEVT 424 transaction which occurred on cycle 5 852.

Figure 9:
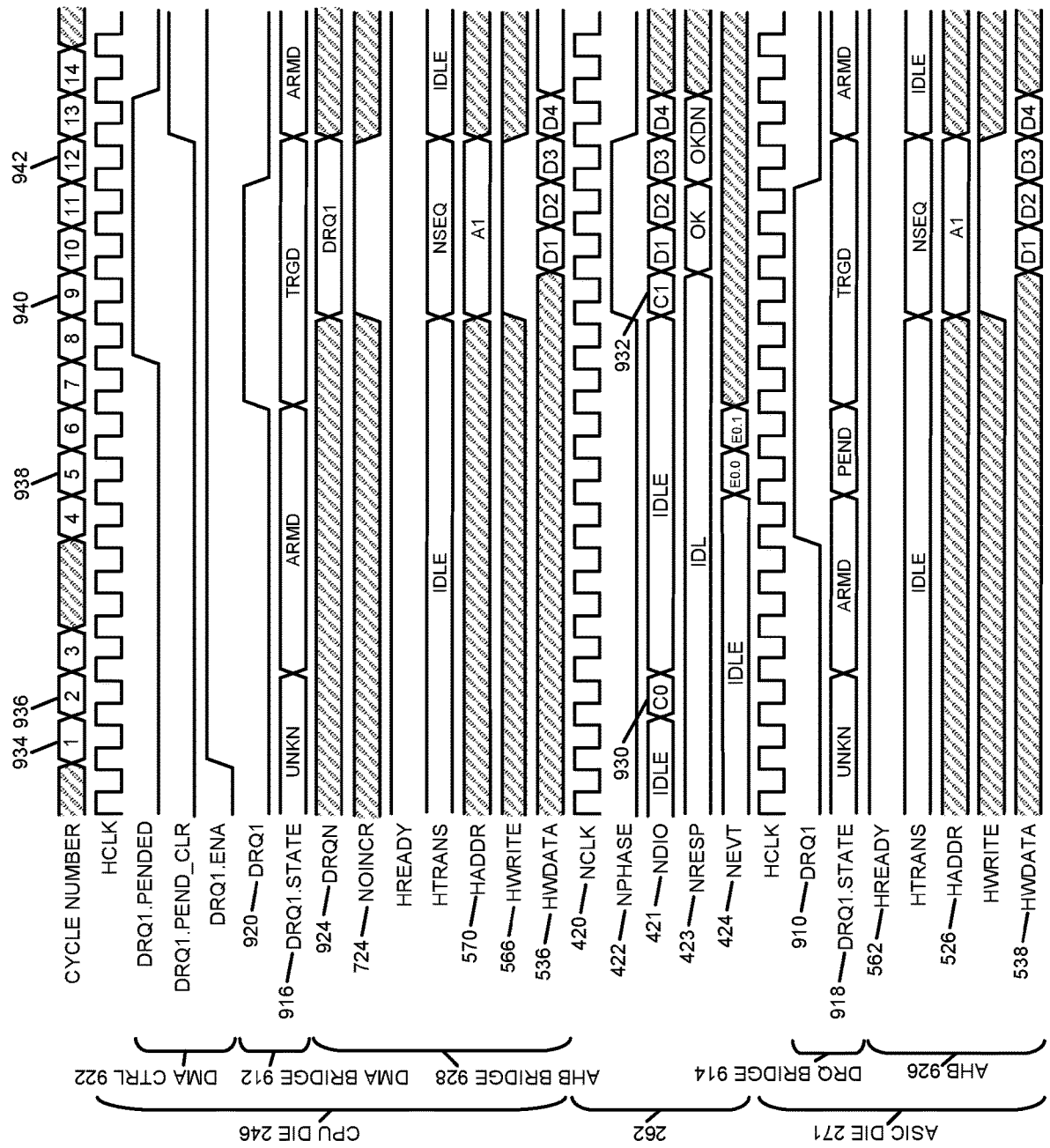
FIG. 9 is a drawing illustrating selected details of an embodiment of a sequence diagram showing DMA request synchronization between an ASIC-die DMA enabled bus slave and a CPU-die DMA controller.

FIG. 9 depicts an example sequence diagram showing DMA request synchronization between an ASIC die 271 DMA enabled bus slave and the signals 922 included inside of DMA controller 212 of the CPU die 246. In this example, a DMA capable AHB die peripheral provides DMA request DRQ1 910 which should be synchronized to CPU die DMA request DRQ1 920 which should result in a CPU die DMA controller to implement a four-cycle burst write to a FIFO address on the ASIC die 271. At the start of the sequence, the DMA controller 212 has not yet been enabled for that channel. The CPU and ASIC die DRQ bridges 912 and 914 each maintain states 916 and 918 for the DRQ synchronization between the two dies independently for each DRQ channel (there are also signals inside of DRQ synch state machines 414 and 428). In the beginning of this sequence, the CPU die 246 state for DRQ channel DRQ1 920 is UNKN, indicating it has no knowledge of the DRQ1 910 signal on the ASIC die 271, and while in this state it provides an inactive level to the DRQ1 920 input to the DMA controller 212. This state is the initial state from reset and is entered whenever the DMA controller 212 has that DRQ channel disabled for servicing. The ASIC die bridge 365 initial state for DRQ1 910 is DISA, which indicates to that side of the bridge that the CPU die 246 is uninterested in DRQ synchronization for that channel.

On cycle 1 934, servicing of DRQ1 920 is enabled in the DMA controller 212. The CPU die DRQ bridge 912 receives a signal DRQ1.ENA indicating that the DMA channel is enabled for servicing. As its synchronization state is UNKN, it requests a special command C0 930 on the NDIO 421 interconnect requesting synchronization from the ASIC die 271 DRQ bridge 914 for DRQ channel DRQ1 910. CPU die 246 DRQ bridge 912 enters the ARMD state for that DRQ channel on successful completion of transaction C0 930. While in the AMRD state it provides inactive indication to the DMA controller 212 for DRQ1 920. On reception of command C0 930, ASIC die DRQ bridge 914 enters the ARMD state for its DRQ1 910 synchronization state 918.

While the DRQ bridge 914 of the ASIC die is in the ARMD state for the DRQ1 910 channel, it examines the DRQ1 910 indication and enters the PEND state for that channel if the signal is observed to be active. This occurs on cycle 4. While in PEND state it requests the NEVT 424 bridge to send an indication of DRQ1 activation to the CPU die 246. On cycle 5 938, the NEVT 424 bridge is not busy and so it begins the two-cycle serialization for event E0 to send the DRQ1 activation indication. Upon completion of this event transmission, ASIC die DRQ bridge 914 enters TRGD state. Indication of reception of NEVT 424 event E0 on cycle 6 is provided to CPU die DRQ bridge 912. As the DRQ bridge 912 is in the ARMD state for DRQ1 channel when receiving this event, it enters the TRGD state for that channel. While the CPU die DRQ bridge 912 is in the TRGD state for the DRQ1 channel, it provides active DRQ indication DRQ1 920 to the DMA controller 212 unless it is receiving indication from the transactional interconnect that a bus transaction is receiving an OKDN response on NRESP 423 for a BUS transaction related to that DRQ channel. In this case it is not receiving this indication and so it asserts DRQ1 920 to the DMA controller 212.

On cycle 9 940, the DMA controller 212 begins the programmed AHB burst transaction responsive to the assertion of its DRQ1 920 input. It provides additional address phase information DRQN 924 to the CPU die bridge 350 during the AHB address phase, indicating that the transaction is part of a DRQ1 920 responsive sequence. In this case, the required transaction is a non-incrementing burst so it also provides the NOINCR 724 address phase burst hint to indicate the NDIO 421 command phase command C1 932 should indicate non-incrementing burst type. NDIO 421 command C1 932 is issued by the CPU die bridge 350 to initiate the bridged AHB transaction. The ASIC die bridge 365 receives this command and registers the DRQ channel number which should be monitored to be DRQ1 910. During each of the one or more data phases for that transaction, whenever the transaction should indicate data phase successful completion, the NRESP 423 indication will be OK if the DRQ request on the ASIC die 271 for the DRQ channel indicated in the command phase is high during that data phase. If instead that ASIC die 271 DRQ request is low during the data phase NRESP 423 indication is OKDN. For each data phase, the CPU die AHB bridge 926 accepts either OK or OKDN as indicating successful data phase completion. For each CPU die 246 reception of OKDN, it further provides indication of this reception to the DRQ bridge 912. The DRQ bridge 912 responds to this by de-asserting its own DRQ indication to the DMA controller 212 for that channel, and also transitioning its DRQ synchronization state for that channel to ARMD. For each ASIC die 271 transmission of OKDN, the ASIC die 271 DRQ synchronization state for that channel will be changed to ARMD. In this example sequence, this first occurs on cycle 12 942, which synchronizes the deactivation of DRQ1 920 and 910 on both dies in a cycle accurate fashion.

In one embodiment, a CPU die and/or the ASIC die implement with multiple NDIO 421 width configurations which can change at runtime to enable coupling with multiple different configurations for the other die. This is desired because it allows flexibility for a single design to be coupled with multiple other designs with differing interconnect widths. In some embodiments, NEVT and NRESP may also be repartitioned.

Figure 10A:
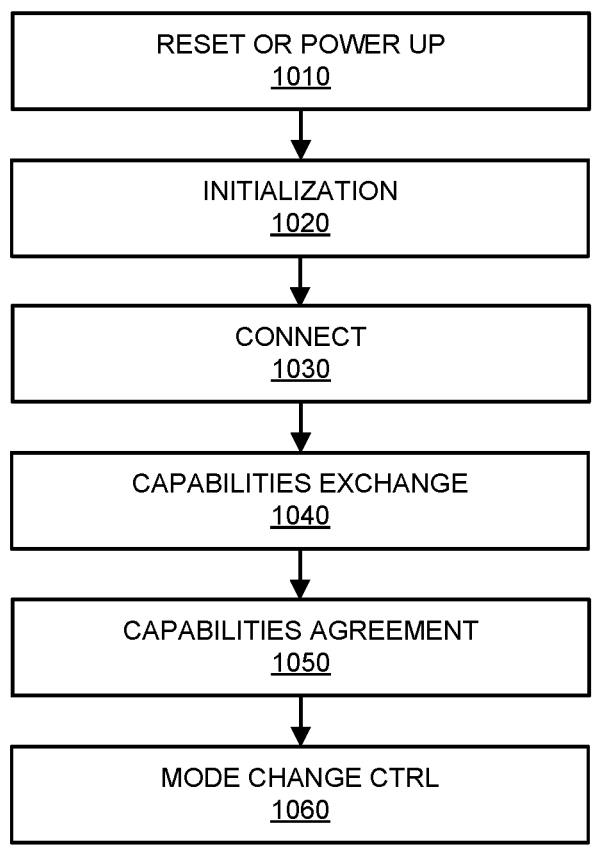
FIG. 10A is a flow diagram illustrating an embodiment of a configuration and discovery process for a two-die system.

FIG. 10A illustrates one embodiment implementing an initial reduced rate data discovery procedure, such as at power-up or a reset 1010, it is possible for the two dies to negotiate their capabilities with each other to determine a mutually supported interconnect width. In one embodiment, at startup or in response to a reset 1010, both dies in some or all interconnect widths run an internal initialization process 1020 limited to the perspective dice, and both could begin by assuming a universally supported small interconnect width and use this to connect 1030 possibly exchanging a plurality of connecting messages. The two dies can then use this minimal format to exchange capabilities 1040 data and then agree 1050 on a better performing format they both support. They might do this e.g., by independent evaluation, or by the CPU die 246 selecting its preferred format and communicating a mode change to the ASIC die using a CTRL transaction 106, or both, e.g., the both dice identify best capabilities set and the CPU die send its chosen set to the ASIC die using a transaction interconnect 460 transaction 1060. Further it may be desired to maintain minimal capabilities to preserve power during normal operations or to renegotiate capabilities during operation such as to optimize interface power consumption. In this case the two dies may start at a lower set of capabilities and the CPU die can always be based on the initial capabilities exchange 1040 chosen later to change the agreement using a CRTL message 1060 without a need for a reset.

Figure 10B:
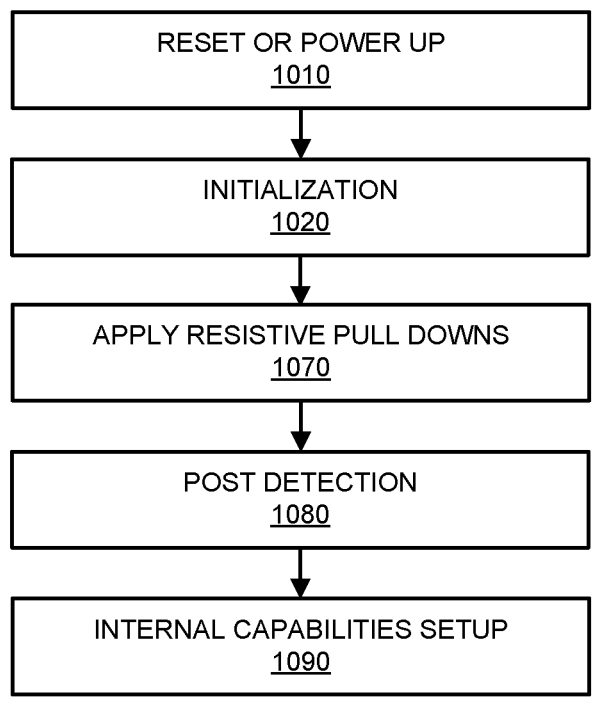
FIG. 10B is a flow diagram illustrating an embodiment of a configuration and discovery process for a two-die system with fixed ASIC-die capabilities.

FIG. 10B is an embodiment of an alternate process of discovery in which the CPU die 246 is capable of some or all interconnect widths but allow the ASIC die to be implemented only limited number preferred widths, such as a set of non-optional signals required by some or all width options and a number of optional signals. Only the interconnects provided by the ASIC die are connected to the CPU die 246, while the other CPU die 246 optional interconnect ports are left unconnected. After reset or power up 1010 and initialization of both dice 1020 the ASIC die might indicate its connectivity during discovery by applying resistive pulls 1070 on some or all of its optional interconnects. The CPU die 246 can do a port detection 1080 by sensing which of its optional interconnect ports can detect the presence of this resistive pull. This way the CPU die can determine the ASIC die interconnect width. Further, using this information the CPU die 246 will set up its internal capabilities 1090 to match the ASIC die without requiring any further message exchange. Once the interconnect width has been detected, the ASIC die can remove the pulls, such as by detecting an appropriate command on NDIO. In one embodiment, the ASIC die can apply pull ups and an IDLE command on NDIO coded as all zeros can indicate pull up removal. Other ASIC die indications such as weak current sources can also be used as an alternative to resistive pulls.

In some embodiments of the processes in FIGS. 10A and/or 10B, there may be additional or fewer operations. Moreover, the order of the operations may be changed, and/or two or more operations may be combined into a single operation.

In one embodiment, the disclosed communication techniques provide a system that always bridges two dice in a master/slave relationship. The CPU die is expected to contain at least one microcontroller core (CPU) and its tightly coupled memories. The CPU die is not limited to a single CPU core and will support a multicore just the same. The CPU die may also contain one or more DMA controllers and memory. The CPU die is not expected to require any direct connection to the lead frame. The ASIC Die can be the gateway of the CPU die to the outside world. It contains memory-mapped peripherals to implement whichever interfaces and logic are required to complement the features of the CPU die for particular applications. The interface bridges bus transactions, interrupt events, and DMA requests between the ASIC Die peripherals and CPU die in a manner which is transparent to the CPU, thus expanding the CPU functionality. From the outside, to the user, the two dies can appear and behave like a single CPU. From the CPU block perspective, the unit 'thinks' that it has direct wired connection to these peripherals, while in truth, they are part of the second die. (See FIGS. 2 and 3 for further details.) To achieve this effect (e.g., application development multi-die transparency) this specification includes multiple embodiments.

Certain choices have been made in the description merely for convenience in preparing the text and drawings, and unless there is an indication to the contrary, the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

Various forms of the words "include" and "comprise" are specifically intended to be construed as abstractions describing logical sets of open-ended scope and are not meant to convey physical containment unless described explicitly (such as followed by the word "within").

Although the foregoing embodiments have been described in some detail for purposes of clarity of description and understanding, the disclosed communication techniques are not limited to the details provided. There are many embodiments of the disclosed communication techniques. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as file types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, subroutines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment-dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the existing approaches, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The disclosed communication techniques are thus to be construed as including numerous possible modifications and variations encompassed within the scope of the claims of the issued patent.

The disclosed embodiments can be (or can be included in) any electronic device. For example, the electronic device may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, a vehicle, a ship, an airplane, a car, a truck, a bus, a motorcycle, manufacturing equipment, farm equipment, construction equipment, or another type of electronic device.

Although specific components are used to describe the embodiments, in alternative embodiments, different components and/or subsystems may be present. Thus, the embodiments of the system and/or the integrated circuit may include fewer components, additional components, different components, two or more components may be combined into a single component, a single component may be separated into two or more components, and/or one or more positions of one or more components may be changed.

Moreover, the circuits and components in the embodiments of the system and/or the integrated circuit may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar. Note that electrical coupling or connections in the preceding embodiments may be direct or indirect. In the preceding embodiments, a single line corresponding to a route may indicate one or more single lines or routes.

An integrated circuit may implement some or all of the functionality of the communication techniques. This integrated circuit may include hardware and/or software mechanisms that are used for implementing functionality associated with the communication techniques.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions that are executed by a processor or in firmware in an integrated circuit.

Moreover, while examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A system, comprising:
a first die comprising:
an interrupt controller having interrupt request inputs; and
a first bridge configured to communicate with a second die; and
the second die electrically coupled to the first die by die-to-die interconnects, wherein the second die comprises:
a number of interrupt sources; and
a second bridge configured to communicate with the first bridge, wherein a number of die-to-die interconnect signals selectively conveyed between the first die and the second die via the die-to-die interconnects is less than a number of the interrupt sources, wherein the first bridge, the second bridge and the die-to-die interconnects are configured to selectively convey interrupt activity from the interrupt sources to a corresponding given interrupt request input, wherein at least some of the interrupt activity conveyed via the die-to-die interconnects comprises different types of interrupt signaling techniques corresponding to different interrupt request activations, and wherein the first bridge and the second bridge are configured to synchronize, on the first die and the second die, the interrupt request activations for the different types of interrupt signaling techniques.

2. The system of claim 1, wherein a software model for the interrupt controller and the interrupt sources are the same as if the interrupt sources were implemented on the first die and connected to the interrupt controller via dedicated signal lines.

3. The system of claim 1, wherein the die-to-die interconnects are configured to communicate the interrupt request activations via event telegrams from the second die to the first die.

4. The system of claim 3, wherein the event telegrams are serialized over more than one bus cycle.

5. The system of claim 3, wherein the event telegrams comprise an enumerated event.

6. The system of claim 1, wherein the first bridge, the second bridge and the die-to-die interconnects are configured to selectively convey events other than interrupts via the die-to-die interconnect signals.

7. The system of claim 1, wherein the first bridge, the second bridge and the die-to-die interconnects are configured to selectively conveyed an assertion of an interrupt request as an event, and to check de-assertion using a polling technique.

8. The system of claim 7, wherein the polling technique is implemented using a different subset of the die-to-die interconnects than is used to convey the interrupt activity.

9. The system of claim 7, wherein the polling technique is activated by a software bus transaction directed at the first bridge.

10. The system of claim 7, wherein the polling technique is activated by hardware in response to clearing of a pending register in the interrupt controller.

11. The system of claim 7, wherein a need for re-polling is determined by hardware in response to configuration of an associated interrupt as being a level-based activation type.

12. A method for communicating interrupt activity, comprising:

providing, from a second bridge in a second die, die-to-die interconnect signals via die-to-die interconnects between the second die and a first die, wherein the second die comprises and number of interrupt sources, and wherein a number of the die-to-die interconnect signals is less than a number of the interrupt sources; and receiving, at a first bridge in the first die, the die-to-die interconnect signals, wherein the first die comprises an interrupt controller having interrupt request inputs, wherein the die-to-die interconnect signals selectively convey interrupt activity from the interrupt sources to a corresponding given interrupt request input, wherein at least some of the interrupt activity conveyed via the die-to-die interconnects comprises different types of interrupt signaling techniques corresponding to different interrupt request activations, and wherein the first bridge and the second bridge synchronize, on the first die and the second die, the interrupt request activations for the different types of interrupt signaling techniques.

13. The method of claim 12, wherein a software model for the interrupt controller and the interrupt sources are the same as if the interrupt sources were implemented on the first die and connected to the interrupt controller via dedicated signal lines.

14. The method of claim 12, wherein the first bride, the second bridge and the die-to-die interconnects communicate the interrupt request activations via event telegrams from the second die to the first die.

15. The method of claim 14, wherein the event telegrams are serialized over more than one bus cycle.

16. The method of claim 14, wherein the event telegrams comprise an enumerated event.

17. The method of claim 12, wherein the first bridge, the second bridge and the die-to-die interconnects selectively convey events other than interrupts via the die-to-die interconnect signals.

18. The method of claim 12, wherein the first bridge, the second bridge and the die-to-die interconnects selectively convey an assertion of an interrupt request as an event, and check de-assertion using a polling technique.

19. The method of claim 18, wherein the polling technique is implemented using a different subset of the die-to-die interconnects than is used to convey the interrupt activity.

20. An electronic device, comprising:

a first die comprising:
 an interrupt controller having interrupt request inputs; and
 a first bridge configured to communicate with a second die; and the second die electrically coupled to the first die by die-to-die interconnects, wherein the second die comprises:
 a number of interrupt sources; and
 a second bridge configured to communicate with the first bridge, wherein a number of die-to-die interconnect signals selectively conveyed between the first die and the second die via the die-to-die interconnects is less than a number of the interrupt sources, wherein the first bridge, the second bridge and the die-to-die interconnects are configured to selectively convey interrupt activity from the interrupt sources to a corresponding given interrupt request input, wherein at least some of the interrupt activity conveyed via the die-to-die interconnects comprises different types of interrupt signaling techniques corresponding to different interrupt request activations, and wherein the first bridge and the second bridge synchronize, on the first die and the second die, the interrupt request activations for the different types of interrupt signaling techniques.

* * * * *